United States Patent
Oner

(10) Patent No.: US 7,440,469 B2
(45) Date of Patent: Oct. 21, 2008

(54) DESCRIPTOR WRITE BACK DELAY MECHANISM TO IMPROVE PERFORMANCE

(75) Inventor: Koray Oner, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 1190 days.

(21) Appl. No.: 10/685,137

(22) Filed: Oct. 14, 2003

(65) Prior Publication Data

US 2005/0078696 A1   Apr. 14, 2005

(51) Int. Cl.
*H04L 12/56*   (2006.01)
(52) U.S. Cl. .................. 370/419; 370/428; 370/429
(58) Field of Classification Search .......... 370/419, 370/428, 429
See application file for complete search history.

(56) References Cited

U.S. PATENT DOCUMENTS

| | | | |
|---|---|---|---|
| 6,115,776 A * | 9/2000 | Reid et al. | 710/260 |
| 6,185,211 B1 * | 2/2001 | Nagatomo et al. | 370/235.1 |
| 6,934,296 B2 * | 8/2005 | Shimojo | 370/428 |
| 6,987,768 B1 * | 1/2006 | Kojima et al. | 370/401 |
| 7,012,926 B2 * | 3/2006 | Weng et al. | 370/412 |
| 7,272,147 B2 * | 9/2007 | Hazama | 370/400 |

* cited by examiner

*Primary Examiner*—Hassan Kizou
*Assistant Examiner*—Jay P Patel
(74) *Attorney, Agent, or Firm*—Garlick Harrison & Markison

(57) ABSTRACT

A multiprocessor switching device substantially implemented on a single CMOS integrated circuit is described in connection with a descriptor write back timer mechanism for use in efficiently writing descriptors back to memory after transmitting data under control of the descriptors to inform the processor(s) about system-related functions for a plurality of channels. A timing interval pulse is provided for prompting descriptor write back operations that are otherwise subject to a minimum descriptor count requirement.

12 Claims, 12 Drawing Sheets

602

DESCRIPTOR WRITE BACK DELAY MECHANISM TO IMPROVE PERFORMANCE

RELATED APPLICATIONS

This application is related to U.S. Provisional Patent Application Ser. No. 60/380,740, filed May 15, 2002; U.S. Provisional Patent Application Ser. No. 60/331,789, filed Nov. 20, 2001; U.S. Provisional Patent Application Ser. No. 60/344,713, filed Dec. 24, 2001; U.S. Provisional Patent Application Ser. No. 60/348,777, filed Jan. 14, 2002, U.S. Provisional Patent Application Ser. No. 60/348,717, filed Jan. 14, 2002, U.S. patent application Ser. No. 10/270,016, filed Oct. 11, 2002 and U.S. patent application Ser. No. 10/269,666, filed Oct. 11, 2002, each of which is incorporated herein by reference in its entirety.

BACKGROUND OF THE INVENTION

1. Field of the Invention

The present invention is directed in general to data communications. In one aspect, the present invention relates to a method and system for improving descriptor based packet processing in microprocessor or multiprocessor computer devices.

2. Related Art

As is known, communication technologies that link electronic devices may use multiprocessor switching devices to route and process signal information. Some communication technologies interface a one or more processor devices for processing packet-based signals in a network of computer systems. Generally, packets are used to communicate among networked computer and electronic systems. Thus, each networked system must receive and transmit packets, and must process the packets directed to that system to determine what is being transmitted to that system.

Typically, each computer system includes one or more interfaces or ports on which packets are transmitted and received. Additionally, each interface generally includes a dedicated DMA engine used to transmit received packets to memory in the system and to read packets from the memory for transmission. If a given system includes two or more packet interfaces, the system includes DMA engines for each interface. Where a computer system processes multiple packet channels using the DMA engines, the processor(s) in the system must be able to monitor the status of the DMA transfers for each channel and other system-related functions associated with the channel transfers.

Conventional systems that use descriptors for DMA transfers typically write back the descriptor to the memory when the DMA engine is done processing the descriptor. In such systems where the descriptor size does not match the memory block size (such as cache memory), the DMA engine in such conventional systems must perform a Read-Modify-Write (RMW) operation in order to write the finished descriptor back to the memory. This requires the DMA engine to wait for reads from the main memory for each RMW operation, thereby degrading the speed and performance of the DMA engine. As the number of channels increases, the unwieldiness of conventional approaches also increases.

Therefore, a need exists for methods and/or apparatuses for improving the processing of descriptor-based packet transfers to quickly and efficiently write packets of data to memory. Further limitations and disadvantages of conventional systems will become apparent to one of skill in the art after reviewing the remainder of the present application with reference to the drawings and detailed description which follow.

SUMMARY OF THE INVENTION

In accordance with the present invention, an integrated circuit system and method are provided for efficiently handling descriptor updating by delaying a descriptor write back until multiple descriptors are available, in which case a single write invalidate operation is used to write back multiple descriptors at once so that a full cache line of descriptors is written. To prevent write back lock up when only a single descriptor is ready for write back, a write back timer mechanism is provided for each active channel so that, if after the timer has expired and no other descriptors are available for combination with the previously completed descriptor, a read-modify-write operation is used to write back the completed descriptor.

In a selected embodiment, an integrated circuit multichannel packet transfer device is provided for transferring a plurality of data packets from an interface circuit to memory. A packet manager circuit coupled between the interface circuit and the memory receives data on a first channel from the interface circuit. The packet manager circuit writes a first data packet or packet fragment to the memory (for example, a system memory or cache memory having a line width of 2N) under control of a first descriptor (for example, a descriptor having a width of N), and writes a second data packet or packet fragment to the memory under control of a second descriptor. When the transfer of the first data packet or packet fragment to the memory is completed, the packet manager releases the first descriptor and a timer generates a first time-out signal at a predetermined time after the first descriptor is released. In the packet manager, a controller is configured to write back a plurality of released descriptors together to memory in a single write-invalidate operation if the plurality of descriptors is ready for transfer before the first time-out signal is generated. However, if the plurality of descriptors is not ready for transfer before the first time-out signal is generated, the controller writes the plurality of descriptors separately to memory as a sequence of read-modify-write operations. In a selected embodiment, the timer is implemented as a multi-bit counter that, for each channel, is coupled to a multiplexer, timer control register and pulse generator. The multiplexer is coupled to select one of the bits in the multi-bit counter for output to the pulse generator in response to the timer control register to generate the first time-out signal. By providing a memory register for storing a minimum descriptor count, the controller is configured to write a plurality of descriptors together to memory in a single write-invalidate operation only if the plurality of descriptors that are ready for transfer meets or exceeds the minimum descriptor count. The timer may also include a memory device for programmable storing a timer setting to selectively determine the predetermined time at which the first time-out signal is generated. The descriptor write back circuitry may be included in a packet manager input circuit and/or in a packet manager output circuit for transmitting data packet or packet fragments from memory on a second channel under control of a plurality of output descriptors. Using a timer for generating a second time-out signal a predetermined time after a first output descriptor is ready for transfer, an output controller writes a plurality of output descriptors back to memory in either read-modify-write mode or write-invalidate mode, depending on whether the plurality of output descriptors is ready for transfer before the second time-out signal is generated.

In an alternate selected embodiment, a data transfer controller is provided for managing the direct memory transfer of data on a first channel. In operation, the data transfer controller releases one or more descriptors associated with a first channel in response to receiving a time-out pulse. The data transfer controller delays release of the descriptors until after receiving the time-out pulse so that a plurality of descriptors received before the time -output pulse is generated are released together with a write-invalidate command. If only one of the plurality of descriptors is received before the time-output pulse is generated, the descriptors are released sequentially with read-modify-write commands. A timer is provided for generating a time-out pulse at a predetermined time interval after a first of the plurality of descriptors is received. The predetermined time interval may be programmable selected from a plurality of timer interval values. The data transfer controller may be included in a packet manager input circuit and/or in a packet manager output circuit for transmitting data packet or packet fragments from memory on a second channel under control of a plurality of output descriptors.

In another selected embodiment, a method is provided for controlling descriptor write back to memory, such as a cache memory having a line width of 32 B when the descriptor has a width of 16 B. Upon receiving packet fragments (which may be comprise an entire packet) at an interface circuit, the packet fragments are transmitted to memory under control of the first and second descriptors. By setting a timer to expire a predetermined time interval after the first descriptor is released, the first and second descriptors may be written back to memory together as a write-invalidate command if the second descriptor is released before expiration of the timer. Otherwise, the first and second descriptors are written back to memory separately as a sequence of read-modify-write commands.

The objects, advantages and other novel features of the present invention will be apparent from the following detailed description when read in conjunction with the appended claims and attached drawings.

DETAILED DESCRIPTION

Figure 1:
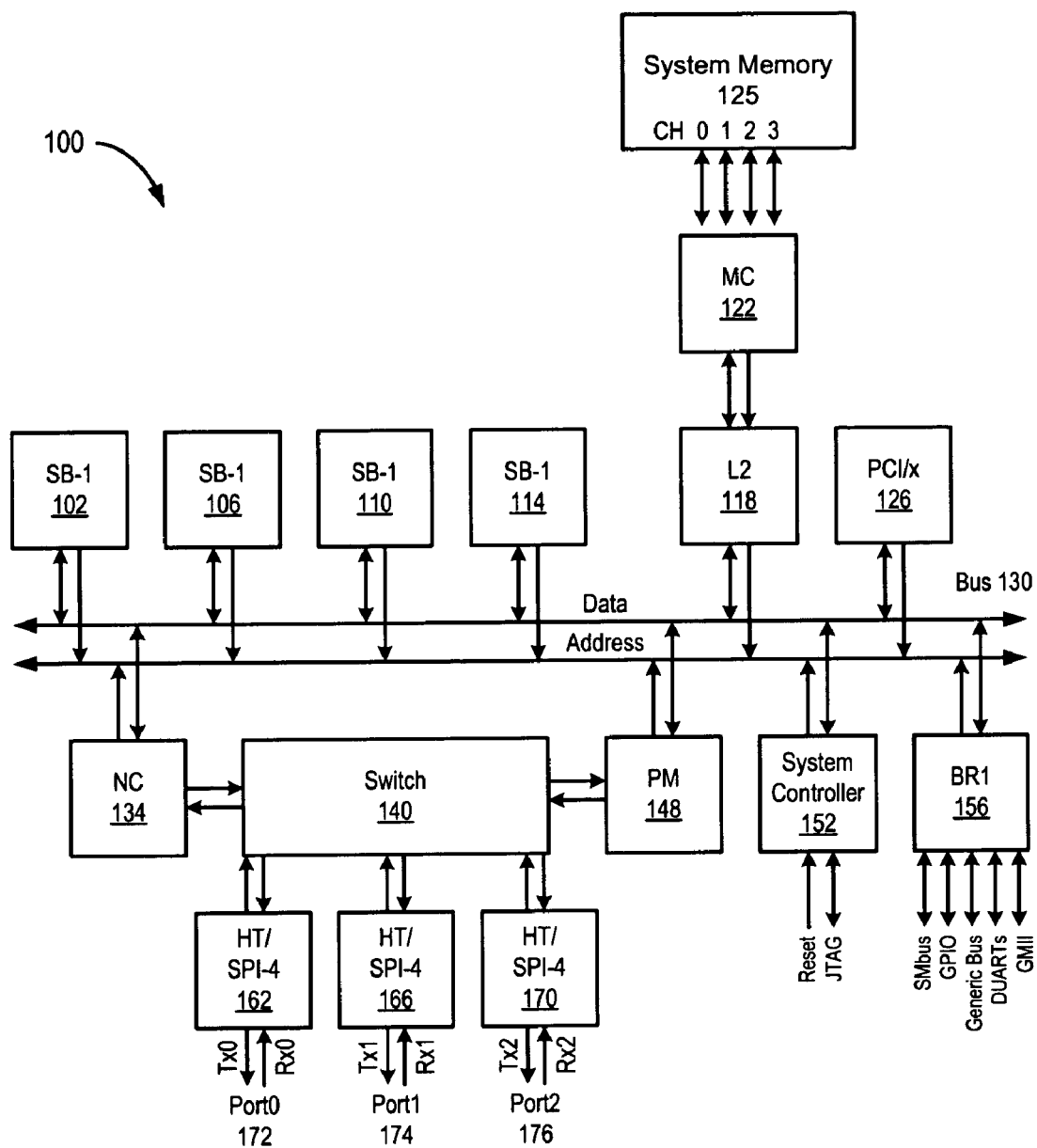
FIG. 1 shows a block diagram of a network multiprocessor switching system-on-a-chip.

An apparatus and method in accordance with the present invention provide a system for routing incoming packets through a multiprocessor switching system-on-a-chip. A system level description of the operation of an embodiment of the multiprocessor switching system of the present invention is shown in FIG. 1 which depicts a schematic block diagram of a multiprocessor device 100 in accordance with the present invention. The multiprocessor device 100 may be an integrated circuit or it may be constructed from discrete components. The multiprocessor device 100 includes a plurality of processing units 102, 106, 110, 114, cache memory 118, memory controller 122, which interfaces with on and/or off-chip system memory 125, an internal bus 130, a node controller 134, a switching module 140, a packet manager 148, a system controller 152 and a plurality of configurable packet based interfaces 162, 166, 170, such as three flexible Hyper Transport/SPI-4 Phase 2 links.

As shown in FIG. 1, the four processors 102, 106, 110, 114 are joined to the internal bus 130. When implemented as standard MIPS64 cores, the processors 102, 106, 110, 114 have floating-point support, and are independent, allowing applications to be migrated from one processor to another if necessary. The processors 102, 106, 110, 114 may be designed to any instruction set architecture, and may execute programs written to that instruction set architecture. Exemplary instruction set architectures may include the MIPS instruction set architecture (including the MIPS-3D and MIPS MDMX application specific extensions), the IA -32 or IA-64 instruction set architectures developed by Intel Corp., the PowerPC instruction set architecture, the Alpha instruction set architecture, the ARM instruction set architecture, or any other instruction set architecture. The system 100 may include any number of processors (e.g., as few as one processor, two processors, four processors, etc.). In addition, each processing unit 102, 106, 110, 114 may include a memory sub-system (level 1 cache) of an instruction cache and a data cache and may support separately, or in combination, one or more processing functions. With respect to the processing system example of FIG. 2, each processing unit 102, 106, 110, 114 may be a destination within multiprocessor device 100 and/or each processing function executed by the processing modules 102, 106, 110, 114 may be a source within the processor device 100.

The internal bus 130 may be any form of communication medium between the devices coupled to the bus. For example, the bus 130 may include shared buses, crossbar connections, point-to-point connections in a ring, star, or any other topology, meshes, cubes, etc. In selected embodiments, the internal bus 130 may be a split transaction bus (i.e., having separate address and data phases). The data phases of various transactions on the bus may proceed out of order with the address phases. The bus may also support coherency and thus may include a response phase to transmit coherency response information. The bus may employ a distributed arbitration scheme, and may be pipelined. The bus may employ any suitable signaling technique. For example, differential signaling may be used for high speed signal transmission. Other embodiments may employ any other signaling technique (e.g., TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired. In addition, the internal bus 130 may be a high-speed (e.g., 128-Gbit/s) 256 bit cache line wide split transaction cache coherent multiprocessor bus that couples the processing units 102, 106, 110, 114, cache memory 118, memory controller 122 (illustrated for architecture purposes as being connected through cache memory 118), node controller 134 and packet manager 148 together. The bus 130 may run in big-endian and little-endian modes, and may implement the standard MESI protocol to ensure coherency between the four CPUs, their level 1 caches, and the shared level 2 cache 118. In addition, the bus 130 may be implemented to support all on-chip peripherals, including a PCI/PCI-X interface 126 and the input/output bridge interface 156 for the generic bus, SMbus, UARTs, GOIP and Ethernet MAC.

The cache memory 118 may function as an L2 cache for the processing units 102, 106, 110, 114, node controller 134 and/or packet manager 148. With respect to the processing system example of FIG. 2, the cache memory 118 may be a destination within multiprocessor device 100.

The memory controller 122 provides an interface to system memory, which, when the multiprocessor device 100 is an integrated circuit, may be off-chip and/or on-chip. With respect to the processing system example of FIG. 2, the system memory may be a destination within the multiprocessor device 100 and/or memory locations within the system memory may be individual destinations within the device 100 (as illustrated with channels 0-3). Accordingly, the system memory may include one or more destinations for the multi-node processing systems. The memory controller 122 is configured to access the system memory in response to read and write commands received on the bus 130. The L2 cache 118 may be coupled to the bus 130 for caching various blocks from the system memory for more rapid access by agents coupled to the bus 130. In such embodiments, the memory controller 122 may receive a hit signal from the L2 cache 118, and if a hit is detected in the L2 cache for a given read/write command, the memory controller 122 may not respond to that command. Generally, a read command causes a transfer of data from the system memory (although some read commands may be serviced from a cache such as an L2 cache or a cache in the processors 102, 106, 110, 114) and a write command causes a transfer of data to the system memory (although some write commands may be serviced in a cache, similar to reads). The memory controller 122 may be designed to access any of a variety of types of memory. For example, the memory controller 122 may be designed for synchronous dynamic random access memory (SDRAM), and more particularly double data rate (DDR) SDRAM. Alternatively, the memory controller 122 may be designed for DRAM, DDR synchronous graphics RAM (SGRAM), DDR fast cycle RAM (FCRAM), DDR-II SDRAM, Ramous DRAM (RDRAM), SRAM, or any other suitable memory device or combinations of the above mentioned memory devices.

The node controller 134 functions as a bridge between the internal bus 130 and the configurable packet-based interfaces 162, 166, 170. Accordingly, accesses originated on either side of the node controller will be translated and sent on to the other. The node controller also supports the distributed shared memory model associated with the cache coherency non-uniform memory access (CC-NUMA) protocol.

The packet manager 148 circuitry communicates packets between the interfaces 162, 166, 170 and the system memory, and may be a direct memory access (DMA) engine that writes packets received from the switching module 140 into input queues of the system memory and reads packets from output queues of the system memory to the appropriate configurable packet-based interface 162, 166, 170. The packet manager 148 may include a packet manager input and a packet manager output, each having its own DMA engine and associated cache memory. The cache memory may be arranged as first-in-first-out (FIFO) buffers that respectively support the input queues and output queues.

The packet manager circuit 148 comprises circuitry shared by the interfaces 162, 166, 170. The packet manager may generate write commands to the memory controller 122 to write received packets to the system memory, and may generate read commands to read packets from the system memory for transmission by one of the interfaces 162, 166, 170. In some embodiments, the packet manager 148 may be a more efficient use of hardware than having individual DMA engines for each of the interfaces 162, 166, 170. Additionally, the packet manager may simplify communication on the bus 130, in some embodiments, for packet data transfers. It is noted that, in some embodiments, the system 100 may include an L2 cache coupled to the bus 130. The packet manager 148 may be configured, in some embodiments, to cause a portion of the packet data to be stored into the L2 cache in addition to being stored in memory. In some embodiments, the packet manager 148 may use descriptors to locate the memory locations for reading and writing packet data. The descriptors may be stored in the L2 cache or in main memory. The packet manager 148 may read and write the descriptors as well.

In some embodiments, the interfaces 162, 166, 170 may have dedicated communication paths to the node controller 134 or packet manager 148. However, in the illustrated embodiment, the system 100 employs a switch 140. The switch 140 may selectively couple one of the receive/transmit interfaces 162, 166, 170 to the node controller 134 or packet manager 148 to transfer received data. The switch 140 may selectively couple the packet manager 148 to one of the interfaces 162, 166, 170 to transfer packet data from the packet manager 148 to the interfaces 162, 166, 170 for transmission on the corresponding ports 172, 174, 176. The switch 140 may have request/grant interfaces to each of the interfaces 162, 166, 170 and the packet manager 148 for requesting transfers and granting those transfers. As will be appreciated, a receive/transmit interface includes any circuitry configured to communicate on a port according to the protocol defined for the port. The interface may include receive circuitry configured to receive communications on the port and to transmit the received communications to other circuitry internal to the system that includes the interface. The interface may also include transmit circuitry configured to receive communications from the other circuitry internal to the system and configured to transmit the communications on the port. The switching module 140 functions to direct data traffic, which may be in a generic format, between the node controller 134 and the configurable packet-based interfaces 162, 166, 170 and between the packet manager 148 and the configurable packet-based interfaces. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol. In a selected embodiment, a 256-Gbit/s switch 140 connects the on-chip memory 118 and processors 102, 106, 110, 114 to the three Hyper Transport/SPI-4 links 162, 166, 170, and provides transparent forwarding of network, ccNUMA access, and Hyper Transport packets when necessary.

The configurable packet-based interfaces 162, 166, 170 generally function to convert data from a high-speed communication protocol (e.g., HT, SPI, etc.) utilized between multiprocessor devices 100 and the generic format of data within the multiprocessor devices 100. Accordingly, the configurable packet-based interface 162, 166, 170 may convert received HT or SPI packets into the generic format packets or data words for processing within the multiprocessor device 100, such as by using a receiver interface (which amplifies and time aligns the data received via the physical link and then converts the received protocol-formatted data into data from a plurality of virtual channels having the generic format), hash and route block and receiver buffer for holding the data until a routing decision is made. Packets arriving through receiver interface(s) of the chip can be decoded in either SPI-4 mode (native packet mode) or in HyperTransport (HT) mode, in which case, it uses a special extension called Packet-over-HT (PoHT) to transfer the packets. From a logical perspective, both modes provide almost identical services. In addition, the configurable packet-based interfaces 162, 166, 170 may convert outbound (transmit) data of a plurality of virtual channels in the generic format received from the switching module 140 into HT packets or SPI packets, such as by using a transmitter formatter and transmitter interface, which take the incoming packet data chunks from the switch and format them according to the mode it is configured in, and then drive the high-speed formatted stream of data onto the physical link coupling the present multiprocessor device 100 to another multiprocessor device. The particular conversion of packets to generic formatted data performed by the configurable packet-based interfaces 162, 166, 170 is based on configuration information, which, for example, indicates configuration for HT to generic format conversion or SPI to generic format conversion.

The system controller 152 is coupled to provide interrupts to the interrupt lines in processors 102, 106, 110, 114 and is further coupled to receive interrupt requests from system modules (such as packet manager 152 or packet-based interfaces 162, 166, 170 illustrated in FIG. 1) and from other devices within the system 100 (not shown). In an alternative embodiment described herein, the interrupt mapping function may instead or in addition be provided in the various system modules that generate interrupts, such as the packet manager 152 or packet-based interfaces 162, 166, 170 illustrated in FIG. 1. The system controller 152 may map each interrupt to one of the interrupt lines of processors 102, 106, 110, 114, and may assert an interrupt signal to the selected processor 102, 106, 110, 114. The processors 102, 106, 110, 114 may access the system controller 152 to determine the source of a given interrupt. The system controller 152 may employ any mapping mechanism. In one embodiment, the system controller 152 may comprise a channel register and a source register to map each interrupt request to each processor 102, 106, 110, 114. The channel register identifies to the processor which channels are generating interrupts, and the source register indicates the real source of a channel's interrupt. By using a programmable interrupt controller in the packet manager with interrupt channel and source information stored in configuration status registers, the interrupt mapped can mask events and vector interrupts to their final destination using at most two CSR read operations by the processor, although additional mapping can be done in the system controller 152.

In one embodiment, the interfaces 162, 166, 170 may support a set of virtual channels (VCs) in which packets are transmitted. A virtual channel corresponds to the notion of "port" in the SPI-4 specification, and may be used to provide virtual independent flow of packets. The VC is "virtual" in that all the data paths, including at the I/Os, are provided through a single physical channel, for example by time-multiplexing multiple flows through a single physical channel. Each virtual channel is defined to flow independently of the other virtual channels, even though the virtual channels may share certain physical resources (e.g., the port 172, 174, 176 on which the packets are flowing). These virtual channels may be mapped to internal virtual channels (also referred to as output virtual channels). The data paths of the high-speed ports 162, 166, 170, the switch 140, and the packet manager 148 all support virtual channels. That is, the switch may grant a coupling between a source and a destination based not only on the ability of the source to transfer data and the destination to receive data, but also on the ability of the source to transfer data in a particular output virtual channel and the destination to receive data on that output virtual channel. Thus, requests from sources may indicate the destination and the virtual channel on which data is to be transferred, and requests from destinations may indicate the virtual channel on which data may be received. Additionally, in some embodiments, the switch 140 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

In one embodiment, the system 100 (and more particularly the processors 102, 106, etc., the memory controller 122, the interfaces 162, 166, etc., the node controller 134, the packet manager 148, the switch 140, the system controller 152 and the bus 130) may be integrated onto a single integrated circuit as a system on a chip configuration. Additional circuitry (such as PCI interfaces, serial interfaces, Personal Computer Memory Card International Association (PCMCIA) interfaces, etc.) may also be integrated. Alternatively, other embodiments may implement one or more of the devices as separate integrated circuits. In another configuration, the system memory may be integrated as well. Alternatively, one or more of the components may be implemented as separate integrated circuits, or all components may be separate integrated circuits, as desired. Any level of integration may be used. The system 100 may be designed to take advantage of the integration by tightly coupling the components to provide high performance packet processing. Specifically, the processors 102, 106, etc., the L2 cache 118, the memory controller 122, and the packet interface circuits 162, 166, 170 may be tightly coupled to receive packets, process them, and forward the packets on (if necessary).

The tight coupling may be manifested in several ways. For example, the interrupts may be tightly coupled. An I/O device (e.g., the packet interface circuits 162, 166, 170) may request an interrupt which is mapped (via an interrupt map in the packet manager or system controller) to one of the processors 102, 106, 110, 114. Another situation arises where descriptors are processed by software in connection with the packet manager operations. In both situations, a minimum count of processed packets or descriptors is sometimes required before processing the interrupt or descriptor so that the system 100 functions efficiently, but a timer is required to prevent such a minimum count requirement from blocking an interrupt from issuing or a descriptor from being processed.

As will be understood, the multiprocessor device 100 of the present invention provides multiprocessing functionality on its own which makes it suitable for scientific and embedded applications requiring significant computational capabilities. In a selected embodiment, the multiprocessor device 100 of the present invention contains a number of peripherals along with its sophisticated memory and communication support. For example, in a selected embodiment, the processor cores (e.g., 102) are 0.8 to 1.2-GHz, 64-bit MIPS with 64 Kbytes of level one cache memory per processor and 1 Mbyte of level two cache 118 per chip; an 800-MHz DDR controller 122; off-chip ccNUMA support and optional ECC support. Three 8/16-bit receive/transmit ports 162, 166, 170 are also provided that are configurable as either HyperTransport or SPI-4 links. Additional peripheral features include a 32-bit 33/66-MHz PCI interface or 64-bit 133 MHz PCI/x interface 126; an input/output bridge 156 that includes a 10/100/1000 Ethernet MAC interface, general-purpose I/O ports, SMBus serial interfaces and four Darts.

In addition to providing stand alone computational functions, the multiprocessor devices 100 may also be used in communication-oriented applications that need significant computational support, like an array of Hyper Transport linked chips for use with Internet service routers and switches with deep content switching and differentiated services such as quality-of-service (QoS) and virtual private networks (VPNs). The multiprocessor devices 100 may also be used in Internet-Protocol (IP) servers and subscriber-management platforms, servers supporting high computational requirements for scientific or Enterprise Java environments, and wireless infrastructure equipment. With three ports 172, 174, 176 on the chip, up to eight chips can be connected via the Hyper Transport links in a "cube" configuration of nodes, for a 32-processor system.

When used in a Hyper Transport linked network, the multiprocessor devices 100 provide a highly integrated no uniform memory access (NUMA) architecture with low power consumption that multiplexes memory and I/O traffic on the same link. In contrast to conventional symmetrical multiprocessing systems (where all processors have the same memory access time and a bus or switch acts as an interface between processors and the memory subsystem so that cache coherence is maintained by monitoring the bus or the switch traffic), with NUMA, the memory address space is made up of the combined local memory (e.g., system memory 125) from each node in the system. A processor can access its local memory faster than nonlocal memory. NUMA systems have the advantage of being easily expanded, while adding a processor to a conventional SMP shared memory architecture is more difficult because an additional port is needed.

By using a cache-coherent form of NUMA (ccNUMA), on-chip caches can remain up to date even while data moves through the processor/memory interconnect. The on-chip double-data-rate (DDR) memory controller 122 supports the chip's local, off-chip memory, and its Hyper Transport links 162, 166, 170 provide ccNUMA support.

Figure 2:
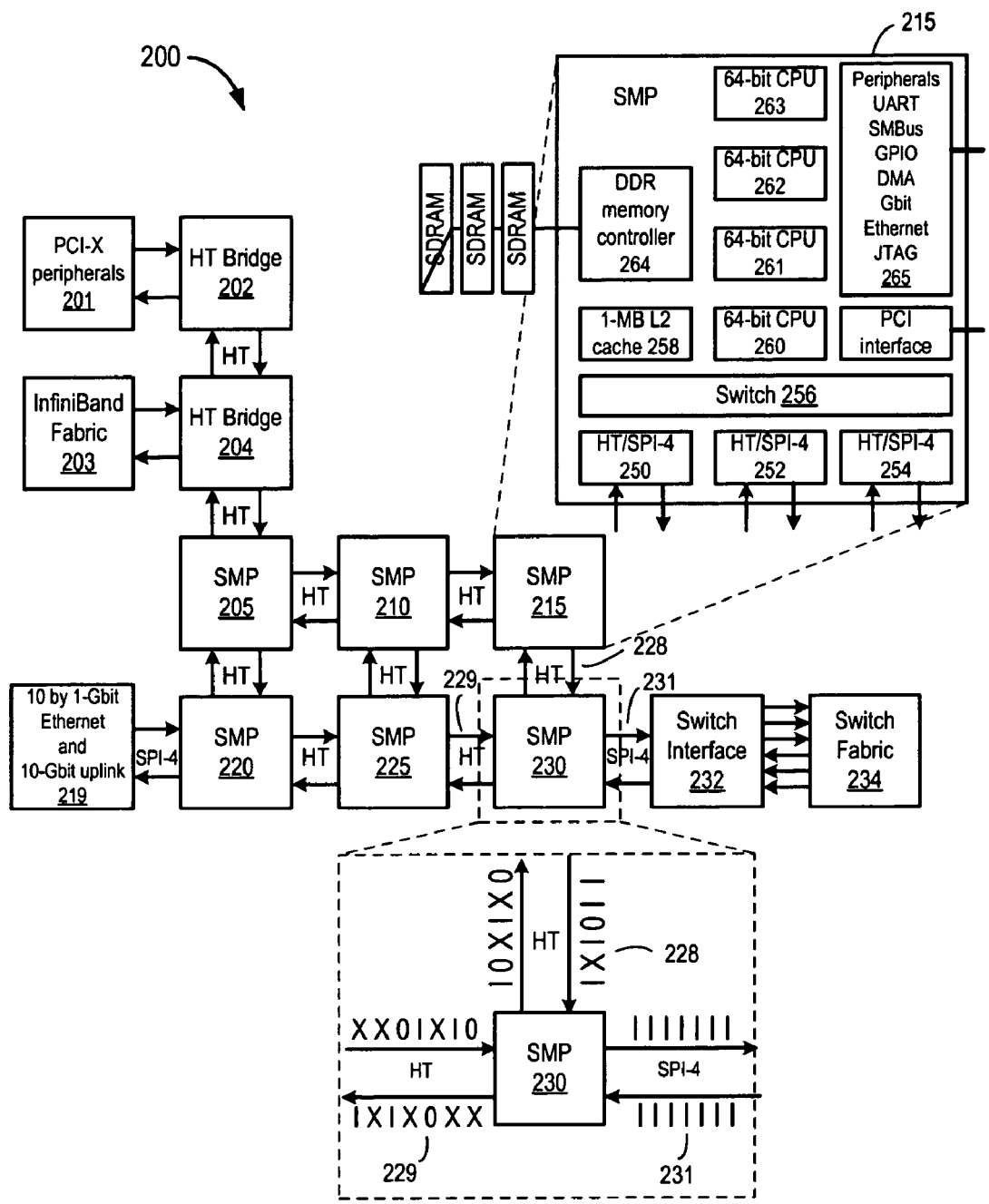
FIG. 2 depicts an example multiprocessor switch application of the present invention.

FIG. 2 depicts an example multiprocessor switch application of the present invention showing how the Hyper Transport/SPI-4 link architecture can be used in communication and multichip multiprocessing support. As illustrated, each link (e.g., 250, 252, 254) can be configured as an 8- or 16-bit Hyper Transport connection, or as a streaming SPI-4 interface. In addition, each link includes hardware hash and route acceleration functions, whereby routing information for an incoming packet are calculated. The routing information determines how a packet will steer through the internal switch (e.g., 256) of a multiprocessor device (e.g., 215). The destination through the switch can be either an output port or the packet manager input. Generally speaking, the steering is accomplished by translating header information from a packet (along with other input data) to an output virtual channel (OVC). In addition, the Hyper Transport links (e.g., 250, 252, 254) work with a mix of Hyper Transport transactions, including encapsulated SPI-4 packets and nonlocal NUMA memory access.

Large amounts of streaming data can also be handled when a port (e.g., 231) is set up as an SPI-4 link. This is ideal for high-speed communication environments. It can supply a link to external communication connections that have a native SPI-4 interface like Ethernet MACs 219 or to switch-fabric interface chips 232, 234.

As illustrated in FIG. 2, three Hyper Transport links (e.g., 228, 229, 231) enable an expandable system. Two links (e.g., 228, 229) are needed for a pass-through architecture where multiple units (225, 230, 215) are daisy-chained together. In this configuration, the links 228, 229 between multiprocessor units carry HT I/O packets (indicated as "X" data in FIG. 2), ccNUMA packets (indicated as "0" data in FIG. 2) and/or SPI-4 packets (indicated as "|" data in FIG. 2). The pass-through architecture is ideal for processing as data moves along the chain. Unfortunately, implementing the same links for NUMA transfers will reduce the bandwidth available for other traffic. It is possible to link a pair of chips using the third link for NUMA transfers if the daisy-chained link bandwidth is needed for I/O or network packets. A third link allows the nodes in the array to extend in another direction. This can work in two ways. It can supply another path for a daisy-chain architecture. It can also provide additional processors to work on data forwarded from the daisy-chain data stream. This is great for such applications as the VPN processing that is handed off to additional processing nodes. Alternatively, when the third link (e.g., 231) is used to connect the multiprocessor unit 230 to an external switch interface 232, the third link carries SPI-4 packets (indicated as "|" data in FIG. 2).

Figure 3:
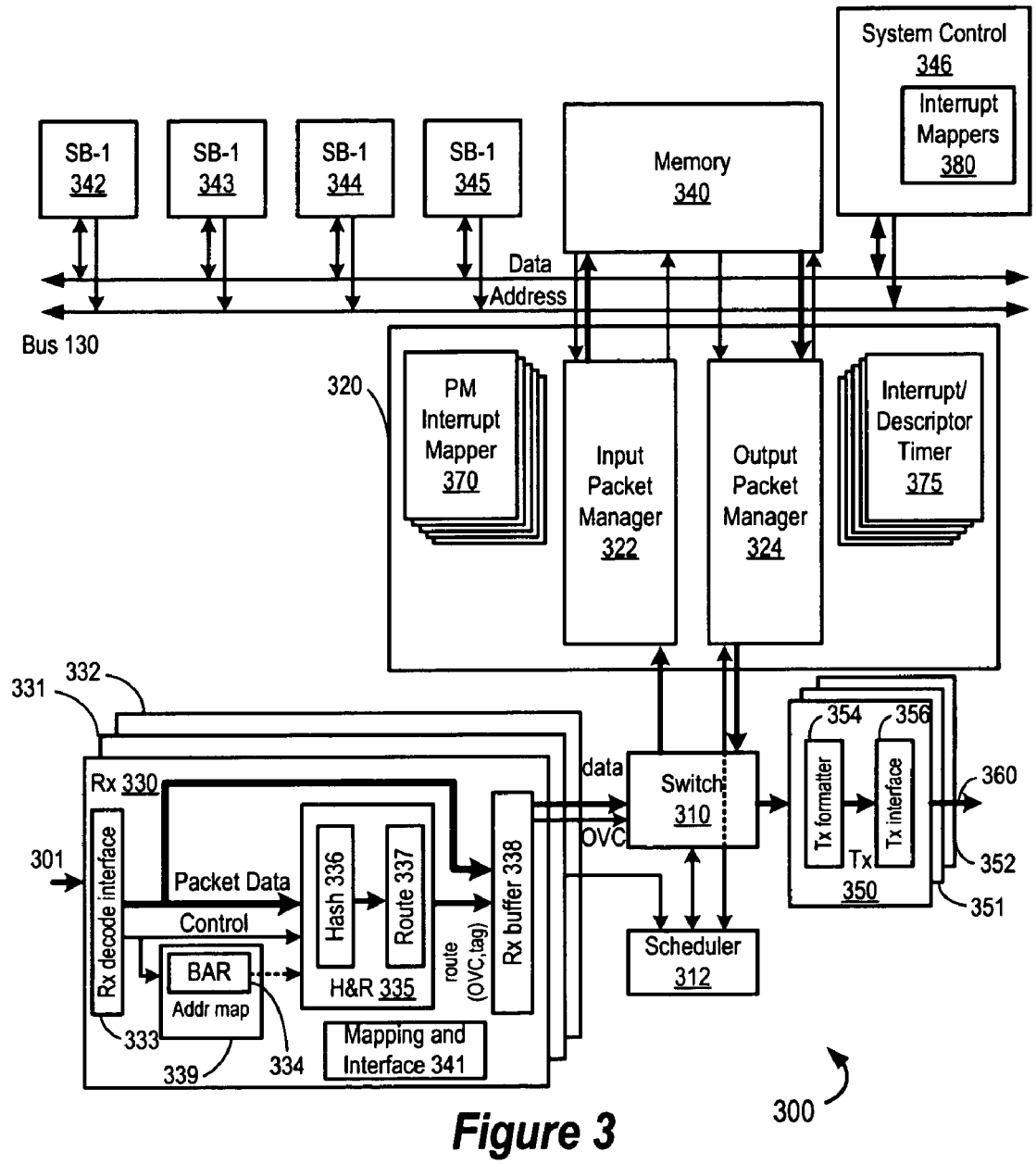
FIG. 3 depicts an embodiment of the timer request generator in accordance with the present invention.

FIG. 3 depicts additional selected details concerning the receiver port and packet manager of the multiprocessor device of the present invention which includes a time-out signal generator 375 for use with issuing interrupts and handling descriptors in accordance with the present invention. In particular, each receiver circuit 330-332 includes a hash and route (H&R) circuit 335 in the illustrated embodiment, which maps packets from the IVCs to an output virtual channel (OVC). The OVC is used as the internal virtual channel for the system 300, and in particular is used to transmit packets through the switch 310 to the packet manager circuit 320 or to the transmitter circuits 350-352. Viewed in another way, requests to transmit packet data through the switch 310 are made based on the OVC of the packet, which identifies both the destination of the packet and the virtual channel at the destination. The OVC may also be referred to herein as a destination and the virtual channel at the destination. An example of how input virtual channels are routed by the H&R circuit via OVCs to various virtual channels for input queue and transmitter destinations is depicted in U.S.Patent Application Publication No. US 2003/0095559 A1, FIGS. 2-4 and the associated description of which was filed on Oct. 11, 2002, and is incorporated herein by reference in its entirety.

As depicted, the network and system chip 300 includes an on-chip five-port switch 310 that connects a node controller (shown in FIG. 1 as node controller 134) and packet manager 320 to three high-speed transmit receiver circuits 330-332, 350-352. Software resident in the memory 340 and processors 342, 344 may process and modify incoming packets, may require direct storage in memory 340 without modification, and may generate packets for transmission via transmitter circuits 350-352. The node controller manages Hyper Transport (HT) transactions and remote memory accesses for the cache coherent, distributed-shared-memory model of the system. The packet manager 320 provides hardware-assisted packet processing capabilities, such as DMA engines, channel support, multiple input/output queues, TCP/IP checksum functions, and output scheduling. The high-speed receiver and transmitter circuits can operate in one of two modes; HT or SPI-4 Phase 2. The 16-bit HT mode allows connection to companion multiprocessor devices in a daisy-chain configuration, to Hyper Transport bridge chips for additional I/O devices, or to an external switch for scalable bandwidth applications. The SPI-4 mode is intended for direct connection to physical layer network devices—e.g., 10 GE MAC, OC-192 SONET framer, or to an application specific (ASIC) chip that provides customer enabled network functions.

In the embodiment of FIG. 3, the receiver circuit 330 includes a decoder interface 333 (which includes an SPI decoder and an HT decoder including a PoHT BAR register 334), a hash and route (H&R) circuit 335, a receiver buffer 338 and additional interface and mapping circuitry 341 for interfacing with the switch 310 and scheduler 312. Other receiver circuits 331, 332 may be similar. The decoder 333 is coupled to receive input data on the port 301, and is coupled to provide an input virtual channel (IVC) and the packet data to the H&R circuit 335. The decoder 333 is also coupled to provide the packet data to the receiver buffer 338 for storage. The H&R circuit 335 is configured to generate an OVC and optionally a next destination (next_dust) value, which are received by the receiver buffer 338. The receiver buffer 338 is coupled to the switch 310 and scheduler 312. The H&R circuit 335 may also be coupled to a packet manager input map register 341.

The decoder 333 receives the input data from the port 301 and decodes the data according to the SPI specification (in the SPI decoder mode) or the HT specification (in the HT decoder mode). The decoding mode depends on which port 172, 174, 176 the receiver circuit 330 is coupled to, and may be selected in any desired fashion. The PoHT extension to the HT interface defines an address range (stored in the PoHT BAR register 334) to which HT sized-write commands may be directed in order to transmit packet data. The IVC may be carried in the sequence ID field of the HT packet, and selected bits of the address may indicate whether the data is the start of packet, middle of packet, or end of packet, the number of valid bytes in the last double word of the HT packet, and an error status. If an HT sized-write is decoded, and the address is in the address range indicated by the PoHT BAR register 334, the HT packet is a PoHT packet and the data transmitted with the sized write is packet data.

The decoder 333 provides the IVC of the packet and the received packet data to the H&R circuit 335. The H&R circuit 335 may select bytes of the packet data and/or the IVC and generate a corresponding OVC for use by the switch 310 in routing data on the chip 300. While the H&R circuit may implement any hashing and mapping function, in one embodiment the H&R circuit may support a number of programmable rules. Each rule selects bytes from the data (or the IVC) as the packet goes by and compares the selected data to an operand of the rule. Each rule may be evaluated on packet data and the true/false results of each comparison may be input to a path table. The path table includes entries which search for selected true or false results from the rules, and outputs path data from a matching entry. The path data may be an OVC, may be an index to a route table which outputs an OVC, or may select the output of a hash function or an extract function as the index to the route table (which may optionally be added to a base address which is also part of the path data). Additionally, for HT interfaces (such as an HT switch), a next_dust value may be output which is used to indicate to a transmitter circuit 350-352 on an HT interface, which base address to select from a table of base addresses for the write command comprising the PoHT packet. If the OVC indicates a virtual channel for the packet manager input 322, the H&R circuit 335 may use a packet manager input (PMI) map register 341 to map the virtual channel to an input queue of the packet manager input 322.

The path of a packet through the multiprocessor device 300 will now be described with reference to the network and system chip 300 depicted in FIG. 3. In this example, a packet comes into the chip through one of the receiver ports (e.g., 301), reaches software, is potentially modified, then sent to another chip through a transmit port 360.

Packet Reception

1. The packet 301 arrives through one of the three receiver interfaces 330-332 of the chip. The receiver interface (e.g., 330) can run in either SPI-4.P2 mode (native packet mode) or in Hyper Transport (HT) mode, in which case, it uses a special extension called Packet -over-Hyper Transport (PoHT) to transfer the packets. From a logical perspective, both modes provide almost identical services. The receiver interface 330 deals with the specifics of the protocol and converts the control and data streams 301 into an internal packet format for the chip.

2. The packet control and data streams are sent to the hash and route (H&R) block 335, which includes a hash 336 and route 337 functionality. The purpose of the hash block 336 is to extract fields from the packet (specific parts of the headers usually) and hash them if necessary. The hash block 336 provides a small signature of the packet to a route table 337. Hashing is completely optional, can consist of the simple extraction of a byte from the packet, or can be any technique or algorithm that turns a variable-sized amount of text into a fixed-sized output (hash value).

3. The route block 337 takes parameters from the packet (such as the result of the hash and the input virtual channel the packet came in on) and looks up in a table to figure out where exactly the packet will go. Not only is the destination block determined (transmitters 350-352 or packet manager input (PMI) 322), but block-specific values like the virtual channel (for a transmitter) or the input queue (for the PMI) are also output from the route block 337.

4. While the packet is hashed and routed, it is also stored in the receiver buffer 338, which may be a large (e.g., 16 KB) buffer. The stored packet data will stay there until a routing decision has been made and it is scheduled to its destination block. The packet does not need to be entirely stored in the buffer 338 before being sent to its destination. For example, if the routing has been determined early, the first (e.g., 16 byte) chunk of data can be sent as soon as a threshold amount of bytes of the packet has been gathered.

5. As soon as a chunk of data from the packet is ready to go, the receiver interface (e.g., 330) sends a request to the switch scheduler 312. When the chunk can be scheduled, the scheduler 312 applies the required changes to the switch 310 and informs the receiver buffer 338 that it can start transmitting.

6. The receiver buffer 338 sends the chunk of data to the switch 310 and frees up the buffer space for more incoming packet data.

7. In this example, the routing table 337 has determined that the packet should be sent to the packet manager 320 to be processed by software. The input packet manager (PMI) portion 322 receives the packet data from the switch 310. A specific input queue (IQ) of the PMI 322 is chosen for the packet by the H&R module 335.

8. To know where to put the packet data, the PMI 322 reads one or more descriptors from main memory 340 (or from L1 or L2 caches or from a remote note). The descriptors contain the address and sizes of data buffers set aside by software to be used for incoming packets. They are also used as a synchronization mechanism between hardware and software.

9. As soon as the PMI 322 has a buffer to put the packet data into, it starts streaming the data to the memory 340 through the system bus. Once again, the final storage might be in a cache or in main memory.

10. When the PMI 322 is done with the packet, it writes back information about the packet in the descriptor(s) to tell the software that it is done with the packet and communicate some information about the packet (like its size).

11. The software typically waits (e.g., spins) on the descriptors in the various queues and as soon as one is marked ready by the PMI 322, it reads it. It can also be interrupted by the PMI 322 when a new packet arrives. It can also read the current pointer of the PMI 322 for a particular IQ.

12. The packet data is typically read, at least in part, by the software to figure out what to do with it. There is no particular constraint on which CPU 342, 344 deals with which IQ. There must just be some synchronization between the CPUs if IQs are shared.

Software Background Tasks

13. In the background, software finds free data buffers (typically recycled from packets just transmitted from an output queue (OQ)) and updates the descriptors in the IQs to provide the PMI 322 with storage for future packets. The software also updates a count field in the PMI 322 to tell it the number of new descriptors added.

14. As in the previous step, the software needs to reclaim output queue (OQ) descriptors that have been processed by the output packet manager (PMO) in order to free the data buffers and potentially use them for IQ descriptors.

Packet Transmit

15. When the software wants to send or forward a packet (e.g., from CPU 344), it needs to write it into a buffer in memory 340. Depending on the source of the packet data (higher-level software, fragments of input packets . . . ), the software might need to fully copy or create the packet data, modify it or leave it as is.

16. When the packet data is ready, the software will write one or more descriptors in the output queue (OQ) of the PMO 324 that has been chosen for the packet. The descriptor(s) contain essentially the address of the buffer where the packet fragments can be found and their size.

17. The PMO 324 waits for descriptors to be ready for transfer in the OQs. The software writes to a special register in the PMO 324 every time it adds new descriptors to be transmitted. Descriptors are read by the PMO 324 to extract the relevant information.

18. When the address where the packet resides at in memory 340 is known to the PMO 324, through the descriptor(s), the PMO 324 starts reading the address. The PMO 324 has a large output buffer equivalent to the receiver buffer 338, which is used to prefect outstanding packet chunks, waiting for them to be scheduled for transmission.

19. PMO 324 writes the descriptor(s) back to memory 340 when the data associated with each descriptor is completely placed in the output buffer.

20. Each OQ in the PMO 324 sends all of its packets to the same internal destination (block, virtual channel). However, different OQ's can have different destinations. Accordingly, as soon as the PMO 324 has a full chunk of data available, it sends a request to the scheduler 312, much like the receiver interface does in step 5, to get the chunk scheduled to its destination. The scheduler 312 arbitrates between the many requests and when a chunk is scheduled, it changes the connections in the switch 310 and informs the source (the PMO 324 in this case) that it can transmit the chunk.

21. As soon as the PMO 324 gets a grant from the scheduler 312, the PMO 324 transmits the corresponding chunk of data to the switch 310. The PMO 324 can then free and reuse the allocated storage in the PMO buffer.

22. The switch 310 forwards the chunk of data to the final destination, such as a transmitter 350 in this example, as indicated by the scheduler 312.

23. Just like the receiver interfaces, the transmitters 350-352 can run in SPI-4 or HT mode. The transmitter formatter 354 will take the incoming packet data chunks from the switch and will format them according to the mode it is configured in. While the PMO 324 has enough storage to cover the round-trip latency to main memory, the transmitters 350-352 provide minimal buffering (4 KB) required to assemble outbound bursts of data on the high-speed links. In a selected embodiment, all data transmits through a 4 KB transmit buffer.

As will be appreciated, packets can go through the switch 310 without touching memory 340 and CPUs 342, 344 (skipping steps 7 to 21). Packets can also be slinked by software and not be forwarded (skipping steps 14 to 23) or sourced by software directly (skipping steps 1 to 13).

In a selected embodiment, each VC is independently flow-controlled so that if one VC is blocked, the other ones can still flow through. This way, there is no head-of-line (HOL) blocking due to the congestion of a flow. In addition, the flow of packets is controlled so that packets on the same VC travel one after the other, and fragments of different packets cannot be interleaved within the chip 300. By including start of packet (SOP) and end of packet (EOP) signaling in the control signal, the receivers can differentiate between the packets, even when packets of different VCs are interleaved on the input and output ports, depending on the unit of transfer on the underlying physical channel. In SPI-4 mode, each high-speed receive/transmit port (e.g., 162 in FIG. 2) supports multiple (e.g., 16) VCs with independent, calendar -based flow control. In HT mode, each high-speed receive/transmit port uses a special extension to the regular HT protocol called Packet-over-Hyper Transport (POHT) which emulates the functionality of the SPI-4 interface, providing multiple (e.g., 16) independent channels per port (in addition to the regular, non-packet HT and HTcc VCs).

The hash and route (H&R) block 335 makes all of the routing decisions for ingress packets from the high-speed receiver ports 330-332 by calculating, for each packet, an output virtual channel (OVC) which is used for internal switching on the multiprocessor device 300. The packets are then sent to either the packet manager input (PMI) 322 or to one of the transmit ports 350-352. The H&R module 335 is located in each of the three high-speed receiver ports 330-332. As a packet 301 enters the receiver port (e.g., 330), it is decoded and control information is extracted by the receiver interface or decoder 333. The H&R module 335 calculates the routing result by using this control information along with the packet data and several programmable tables in the H&R module 335. Routing information is encoded in the form of a switch or output virtual channel (OVC) which is used by the on-chip switch 310 to route packes. The OVC describes the destination module, such as the PMI 322 or transmitter ports 350-352, and either the input queue number (IQ) in the case of the PMI or the output channel in the case of the transmitter ports. When targeting the packet manager 320, the output virtual channel corresponds directly to IQs. On the output side, the packet manager 320 maps an OQ into one OVC which always corresponds to a transmitter port. In addition, multiple sources can send packets to a single destination through the switch. If packets from different sources(receivers 330, 331, 332 or PMO 324) are targeted at the same output VC of a transmitter port or the IQ of the PMI 322, the switch 310 will not interleave chunks of packets of different sources in the same VC. Both the packet data and its associated route result are stored in the receiver buffer 338 before the packet is switched to its destination. The H&R module 335 can be implemented by the structures disclosed in copending U.S. patent application entitled "Hash and Route Hardware With Parallel Routing Scheme" by L. Moll, Ser. No. 10/684,871, filed Oct. 14, 2003, now U.S. Pat. No. 7,366,092, and assigned to Broadcom Corporation, which is also the assignee of the present application, and is hereby incorporated by reference in its entirety.

Figure 4:
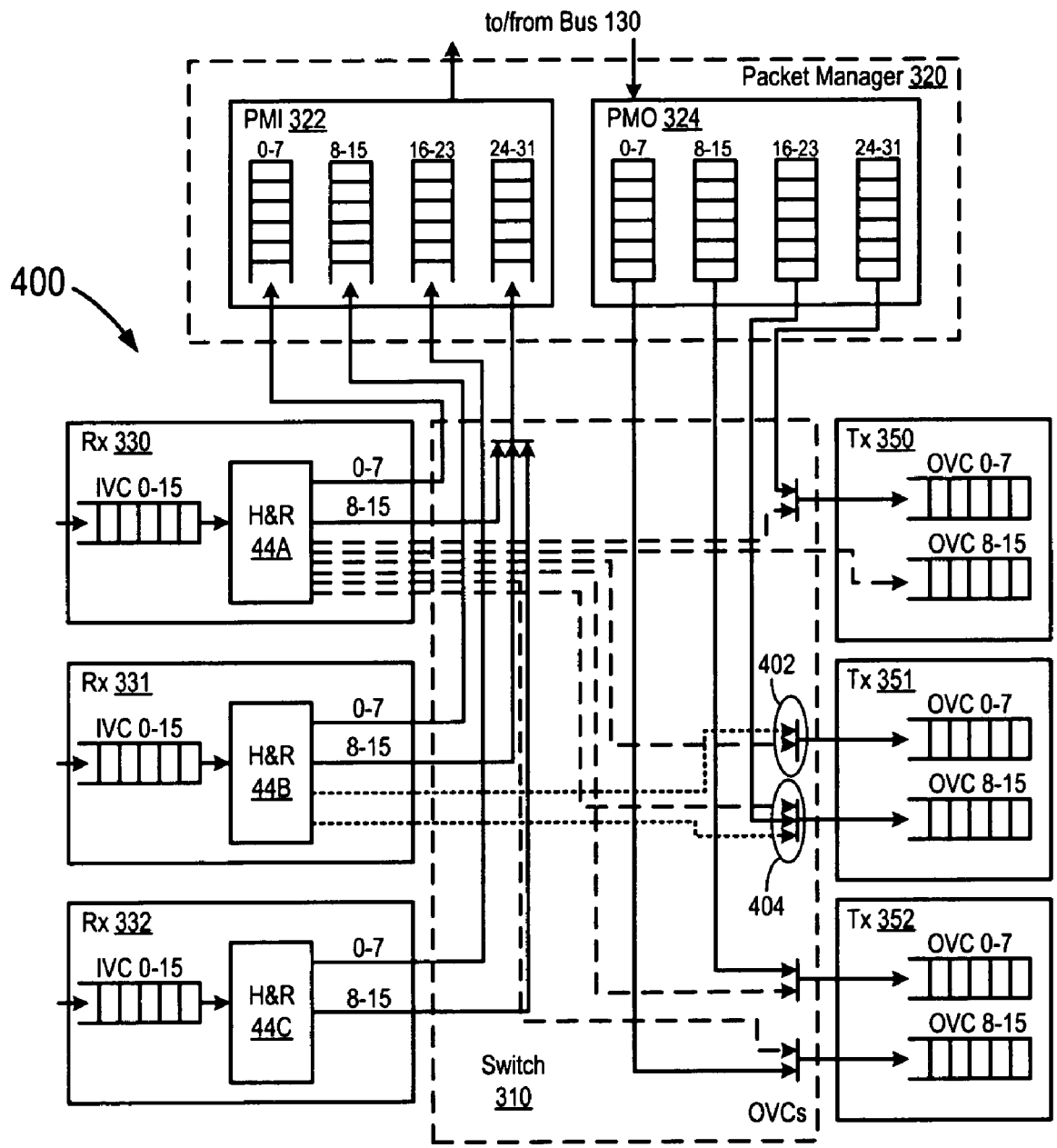
FIG. 4 is a block diagram illustrating one embodiment of virtual channels in the system of FIG. 1.

Turning now to FIG. 4, a block diagram illustrating one embodiment of virtual channels in the system 300 is shown, as well as examples of splitting and merging packet traffic. In the illustrated embodiment, the receive interface circuits 330-332 and the transmit circuits 350-352 are shown. Additionally, the packet manager circuit 320 is shown as including an input packet manager circuit (PMI) 322 and an output packet manager circuit (PMO) 324. The PMI 322 is coupled to transmit write commands on the bus 130 to write received packets to memory. The PMO 324 is coupled to transmit read commands on the bus 130 and to receive the read data comprising packets to be transmitted from the system 300. Additionally, as mentioned above, each of the PMI 322 and the PMO 324 may be configured to read and write descriptors defining the locations in memory to which the packets are to be read and written. In accordance with the present invention, the descriptors are collected until a predetermined number of descriptors accumulates or a descriptor timer 375 expires, whichever occurs first. Each of these events (packet transfer, descriptor processing, errors) and others may cause interrupts to be issued by the packet manager 320 which, in accordance with the present invention, are issued after a predetermined number of packets are processed or an interrupt timer 375 expires, whichever occurs first.

Each receive circuit 330-332 supports a set of input virtual channels (IVCs) defined by the interface from which the receive circuit receives packet data. For example, the SPI-4 interface and the HT interface may both support 16 virtual channels in hardware (although more may be used by software in the SPI-4 interface, since an 8-bit virtual channel value is supported). Thus, each receive circuit 330-332 supports 16 IVCs (numbered 0-15 in FIG. 4). Similarly, each transmit circuit 350-352 supports 16 output virtual channels (OVCs), numbered 0-15 in FIG. 4. Other embodiments may employ more or fewer IVCs and OVCs according to the interfaces supported by those embodiments.

The PMI 322 includes a logical set of input queues (e.g. 32 in the illustrated embodiment, numbered 0-31, although more or fewer input queues may be included in other embodiments). The PMO 324 includes a logical set of output queues (e.g. 32 in the illustrated embodiment, numbered 0-31, although more or fewer output queues may be included in other embodiments). In the packet manager, each queue has its own interrupts that require mapping to a specified processor.

Each receive circuit 330-332 includes a hash and route (H&R) circuit 44A-44C in the illustrated embodiment, which maps packets from the IVCs to an output virtual channel (OVC). The OVC is used as the internal virtual channel for the system 400, and in particular is used to transmit packets through the switch 310 to the packet manager circuit 320 or to the transmit circuits 350-352.

In the illustrated embodiment, the H&R circuits 44A-44C may map the IVCs to one of 16 PMI VCs (numbered 0-15 in FIG. 4, using solid lines from the H&R circuits 44A -44C). These PMI VCs may be further mapped to input queues in the PMI 322, e.g., using a register to which the H&R circuit 44A is coupled. That is, VCs at the PMI 322 may correspond directly to input queues. In the illustrated embodiment, PMI VCs are mapped to input queues in blocks of eight (e.g., PMI VC 0 is input queue 0, 8, 16, or 24; PMI VC 1 is input queue 1, 9, 17, or 25; etc.). In other embodiments, each PMI VC may be individually capable to an input queue, or other sized blocks of input queues may be capable to PMI VCs. In yet another embodiment, the H&R circuits 44A-44C may directly map IVCs to PMI input queues (e.g., without the intermediate step of PMI VCs). Additionally, the H&R circuits 44A-44C may map packets from an IVC to an OVC in one of the transmit circuits 350-352, illustrated for H&R circuit 44A with dashed lines through the OVCs block to the transmit circuits 350-352.

The H&R circuits 44A-44C may be used to split packets from the same IVC to different OVCs (e.g., different input queues in the PMI and/or OVCs in the transmit circuits 350-352). Thus, the H&R circuits 44A-44C may provide software flexibility to separate packets for processing versus packets to be passed through the transmit circuits 350-352 based on various packet attributes (such as header values), or may provide for separating packets into different input queues in the PMI 322 (e.g., for different types of processing) based on various packet attributes. The H&R circuits 44A-44C may also be programmed to map IVCs to OVCs without using any additional packet attributes, or a combination of such mappings and other mappings using additional packet attributes, as desired. In other embodiments, the receive circuits 330-332 may not include H&R circuits and may instead use a programmable or fixed mapping of each IVC to a specified OVC (transmit circuit 350-352 and OVC in that circuit or PMI 322 and an input queue in the PMI 322). It is noted that packets which are routed from a receive circuit 330-332 directly to a transmit circuit 350-352 bypass the packet manager circuit 320, the system memory, and processing by the processors.

The PMO 324 output queues are also mapped to various transmit circuits 350-352 and to OVCs in those transmit circuits 350-352. In the illustrated embodiment, output queues are mapped to transmit circuits and OVCs in blocks of 8, similar to the mapping of IVCs to input queues. Other embodiments may map output queues individually, or in other-sized blocks, as desired. In one embodiment, the PMO 324 includes a configuration register or registers programmed with the mapping of each block of 8 output queues to a corresponding group of OVCs (which identify the transmit circuit 350-352 and the OVC within that transmit circuit). Other embodiments may use more elaborate mapping mechanisms similar to H&R circuits, to map packets based on packet attributes in addition to output queues, if desired.

FIG. 4 illustrates, via the solid arrows between the H&R circuits 44A-44C and the PMI 322, an exemplary mapping from the PMI VCs of the H&R circuits 44A-44C to the input queues of the PMI 322. The exemplary mapping is but one example of the mappings that may be used, as programmed into the receive circuits 330-332 by software. In the example, PMI VCs 0-7 from the H&R circuit 44A are mapped to input queues 0-7; PMI VCs 0-7 from the H&R circuit 44B are mapped to input queues 8-15; PMI VCs 0-7 from the H&R circuit 44C are mapped to input queues 16-23; and PMI VCs 8-15 from each of the H&R circuits 44A-44C are merged to input queues 24-31. When mappings merge the PMI VCs from different H&R circuits 44A-44C, the switch 310 may perform the merging on packet boundaries. That is, when a given receive circuit 330-332 has been granted permission to transfer a packet to an input queue that is merged among the receive circuits 330-332, the switch inhibits granting any other receive circuit 330-332 on that input queue until the granted receive circuit 330-332 reaches a packet boundary. Any combination of PMI VCs from different receive circuits 330-332 may be merged into input queues, as desired in various mappings.

FIG. 4 also illustrates, via the solid arrows between the PMO 324 and the transmit circuits 350-352, an exemplary mapping of output queues to transmit circuits and OVCs. The exemplary mapping is but one example of mappings that may be used, as programmed by software. In the illustrated mapping, output queues 0-7 are mapped to OVCs 8-15 in the transmit circuit 352; output queues 8-15 are mapped to OVCs 0-7 in the transmit circuit 352; output queues 16-23 are mapped to OVCs 8-15 in the transmit circuit 351; and output queues 24-31 are mapped to OVCs 0-7 in the transmit circuit 350. Additionally, receive circuits 330-332 may map IVCs to OVCs, and thus there may be merging of packets from receive circuits 330-332 and output queues to an OVC. Again, the switch 310 may handle this merging on packet boundaries.

As mentioned above, there may be mappings of IVCs in receive circuits 330-332 to OVCs in the transmit circuits 350-352. In FIG. 4, for example, dashed lines illustrate possible mappings from the receive circuit 330 IVCs (via the H&R circuit 44A) to the OVCs of the transmit circuits 350-352. Additionally, dotted lines from the receive circuit 331 (the H&R circuit 44B) to the transmit circuit 351 OVCs illustrate two possible merging of packet streams, one indicated at 402 where the packet stream from receiver 331 merges with a packet stream from receiver 330 into OVC 0-7 in transmitter circuit 351, and the other indicated at 404 where the packet stream from receiver 331 merges with a packet stream from receiver 330 and a packet from PMO channels 16-23 into OVC 8-15 in transmitter circuit 351. Again, the switch 518 may merge packets from different receive circuits 330-332 to a given OVC on a packet boundary basis. Merging may occur between any combination of receive circuits 330-332 and the PMO 324.

The input queues of the PMI 322 and the output queues of the PMO 324 may be logical queues. That is, the queues may actually be implemented in system memory. The PMI 322 and the PMO 324 may include buffers to buffer the packet data being transmitted to and from the system memory. The queues may be implemented in any fashion. In one particular embodiment, each queue is implemented as a descriptor ring (or chain) which identifies memory buffers to store packet data corresponding to a given input queue. In other embodiments, the queues may be implemented in any desired fashion (e.g., linked lists, contiguous memory locations for the packet memory buffers, etc.). The PMI 322 and the PMO 324 may generate read and write commands to fetch and update descriptors.

It is noted that, while the receive circuits 330-332 and the transmit circuits 350-352 are described as supporting various virtual channels for packets, in some embodiments these circuits may support additional virtual channels for other types of traffic. For example, the HT interface is capable of carrying non-packet traffic (e.g., I/O traffic) in additional virtual channels. Additionally, in one embodiment, the HT interface may support coherent virtual channels (that is, virtual channels that carry coherent traffic) for transactions used to maintain coherency among devices on the HT interface. The receive circuits 330-332 and the transmit circuits 350-352 may be designed to additionally route data received on these VCs according to the HT definition and/or coherency requirements.

Figure 5:
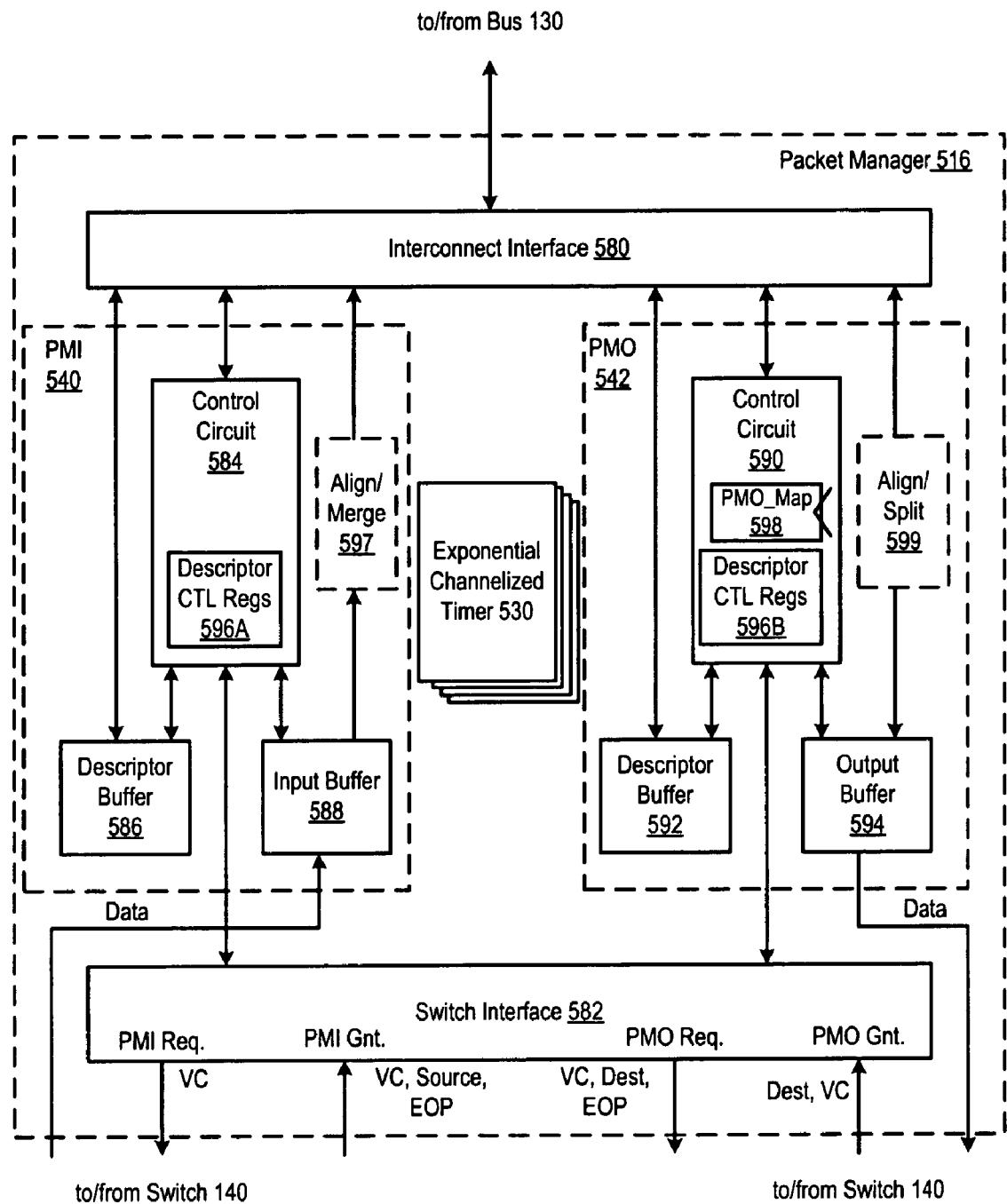
FIG. 5 is a block diagram of one embodiment of a packet manager circuit.

Turning now to FIG. 5, a block diagram of one embodiment of the packet manager circuit 516 is shown in greater detail. In the embodiment of FIG. 5, the packet manager circuit 516 includes an interconnect interface circuit 580 for communicating on the bus 130, the PMI 540, the PMO 542, and a switch interface circuit 582. The PMI 540 includes a control circuit 584, a descriptor buffer 586, and an input buffer 588. The PMO 542 includes a control circuit 590, a descriptor buffer 592, and an output buffer 594. The control circuit 584 includes a set of descriptor control registers 596A, and the control circuit 590 similarly includes a set of descriptor control registers 596B. Additionally, the control circuit 590 includes a PMO Map register 598. The interconnect interface 580 is coupled to the bus 130, the descriptor buffers 586 and 592, the control circuits 584 and 590, the input buffer 588, and the output buffer 594. The control circuit 584 is further coupled to the descriptor buffer 586, the input buffer 588, and the switch interface circuit 582. The input buffer 588 is coupled to receive data from the switch 140. The control circuit 590 is further coupled to the descriptor buffer 592, the output buffer 594, and the switch interface circuit 582. The output buffer 594 is coupled to provide data to the switch 140. The switch interface circuit 582 is coupled to request and grant interfaces to the switch 140 for the PMI 540 and the PMO 542.

Figure 6:
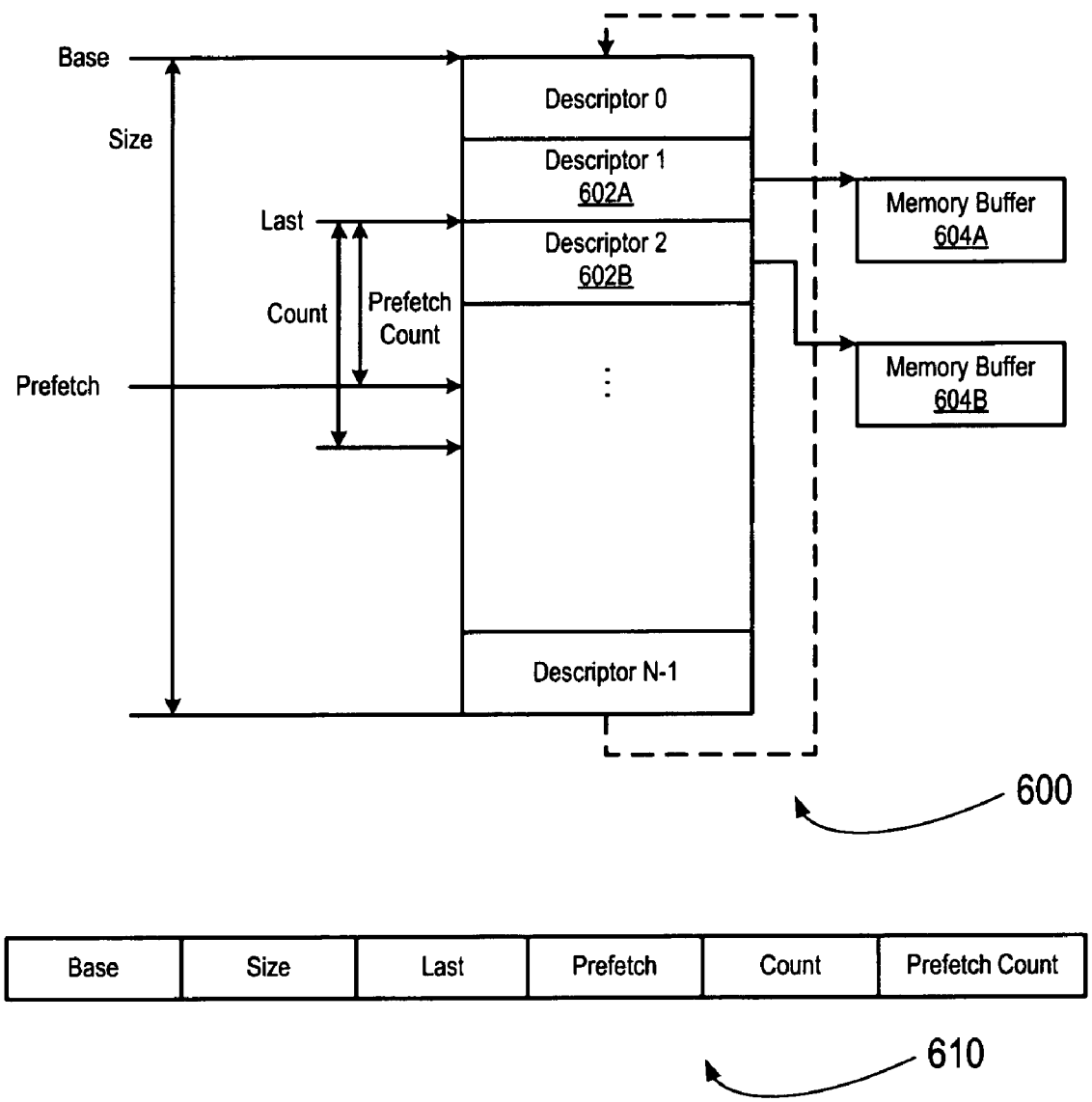
FIG. 6 is a block diagram of one embodiment of a set of descriptors and a corresponding descriptor control register or registers.

The control circuit 584 controls the transfer of packets from the receive interface circuits to the system memory. As mentioned above, the PMI 540 includes a logical set of input queues to which packets may be transferred. Each input queue is implemented, in the present embodiment, via a descriptor ring in memory. The descriptor ring comprises a set of descriptors, each of which identifies a memory buffer in memory that may be used to store packet data for the corresponding input queue. One or more descriptors may be occupied by a given packet. An exemplary descriptor ring for one embodiment is shown in FIG. 6 and described in more detail below.

The control circuit 584 may prefect one or more descriptors (the next descriptors in the ring that are to receive packet data) into the descriptor buffer 586. In one embodiment, for example, up to 8 descriptors may be perfected for each input queue. If at least one descriptor is available to receive packet data in a given input queue, the control circuit 584 may signal the switch interface 582 to request a packet on that input queue. In one embodiment, two descriptors may comprise a cache block. If the software is issuing two or more descriptors at a time, a prefect of both descriptors may be generated as a combined command to reduce the traffic on the interconnect interface 580.

The switch interface circuit 582 may request a packet for an input queue using the PMI request interface. The PMI request interface indicates which input queue (which VC) the PMI has space to store data in. The PMI request interface may also include a valid indication indicating whether or not a request is being made. The PMI request interface may be similar to other destination request interfaces (e.g., those used by the transmit interface circuits). The switch 140 may grant to a source and destination once both the source and the destination have requested a transfer on the same destination VC. The PMI grant interface indicates which source is transferring data, on which VC (which input queue) and whether or not the transfer is the end of the packet (EOP). The switch interface circuit 582 may signal the control circuit 584 when a grant has been received, and the control circuit 584 may cause the corresponding data to be stored in the input buffer 588. The input buffer 588 may include storage for each input queue, to temporarily store packet data until a write command is generated to write the packet data to the memory buffer selected for the packet. In some embodiments, the input buffer 588 may be configured to store less than a full packet for a given input queue.

Generally, the control circuit 584 may generate read commands to the interconnect interface circuit 580 to prefect descriptors into the descriptor buffer 586. Additionally, the control circuit 584 may generate write commands to the interconnect interface circuit 580 to write data from the input buffer 588 to the memory buffer, and to write the descriptor back to memory after the descriptor has been used to store packet data. The interconnect interface circuit 580 may transmit the commands on the bus 130 and, in the case of reads, return data to the descriptor buffer 586. In one embodiment, the bus 130 may perform cache block sized transfers (where a cache block is the size of a cache line in caches within the system 100, e.g. 32 bytes in one embodiment). In such embodiments, if a write command does not write the entire cache block, the interconnect interface circuit 580 may perform a read-modify-write operation to perform the write. As will be appreciated, a read-modify-write operation requires a delay while the cache line being written to is retrieved or read from memory over the system bus 130 so that it can be merged with (or written over in part by) the new data for the cache line. In one embodiment, descriptors may occupy one half of a cache block. In such embodiments, the packet manager circuit 516 may attempt to delay the write of the first descriptor of a cache block to allow the second descriptor to also be written concurrently (thus avoiding a higher latency read-modify-write operation). The delay may be fixed or programmable, and the first descriptor may be written using a read-modify-write operation if the delay expires without a write of the second descriptor. The second descriptor may subsequently be written using a read-modify-write operation as well. Because the system can not wait indefinitely for additional descriptors to be released, a programmable timer is provided in accordance with the present invention described herein for controlling the delay.

The control circuit 590 controls the transfer of packets from memory to the transmit interface circuits. As mentioned above, the PMO 542 includes a logical set of output queues from which packets may be transferred. Each output queue is implemented, in the present embodiment, via a descriptor ring in memory, similar to the input queues. An exemplary descriptor ring for one embodiment is shown in FIG. 6 and described in more detail below.

The control circuit 590 may prefect one or more descriptors (the next descriptors in the ring from which packet data is to be transmitted) into the descriptor buffer 592. In one embodiment, for example, up to 8 descriptors may be perfected for each output queue. If at least one descriptor has packet data in a given output queue, the control circuit 590 may also prefect the packet data into the output buffer 594. Once at least a switch transfer's worth of packet data has been read into the output buffer 594 for a given output queue, the control circuit 590 may signal the switch interface circuit 582 to request a transfer to the destination for that packet (one of the transmit interface circuits) for that output queue. In one embodiment, output queues are mapped to OVCs in the transmit interface circuits in groups of 8, as described above with respect to FIG. 4. The PMO_map register 598 may store the mappings, and thus the control circuit 590 may determine which destination and which OVC at that destination to request based on the mappings.

The switch interface circuit 582 may request a destination for an output queue using the PMO request interface. The PMO request interface may be similar to the request interface from the receiver interface circuits, and generally indicates which destination (which transmit interface circuit) and which VC (OVC) on the transmit interface circuit that the PMO has packet data to transmit. In other words, the PMO request interface generally indicates the OVC that the PMO has packet data to transmit on. Additionally, if the requested transmission will include the end of the packet, the PMO request interface indicates such with the EOP indication. The PMO request interface may also include a valid indication indicating whether or not a request is being made, packet error status, etc. The PMO grant interface, again similar to the receive grant interface, indicates which destination and VC is granted (e.g., which OVC is granted). The switch interface circuit 582 may signal the control circuit 590 when a grant has been received, and the control circuit 590 may cause the corresponding data to be read out of the output buffer 594 to the switch 140 (and ultimately to the destination transmit interface circuit).

Generally, the control circuit 590 may generate read commands to the interconnect interface circuit 580 to prefect descriptors into the descriptor buffer 592 and to prefect packet data into the output buffer 594. Additionally, the control circuit 590 may generate write commands to the interconnect interface circuit 580 to write the descriptor back to memory after the packet data from that descriptor has been read into the output buffer 594. The interconnect interface circuit 580 may transmit the commands on the interface and, in the case of reads, return data to the descriptor buffer 590 and the output buffer 594.

As mentioned above, the interconnect interface circuit 580 may include the circuitry for communicating on the bus 130. Additionally, in some embodiments, the interconnect interface circuit 580 may include buffers to store read and write commands until they can be transmitted on the bus. Again, the programmable timer 530 may be used to generate timer request signals for each channel to be used in controlling the timing of system operations, such as descriptor write back interrupt issuance upon completion of a packet transfer.

In some embodiments, the PMI 540 may include an align/merge circuit 597 coupled between the input buffer 588 and the interconnect interface 580. In one embodiment, a memory buffer for packet data need not be aligned to a cache block boundary in the system memory. The align/merge circuit 597 may align the packet data from the input buffer 588 to the offset specified in the descriptor. Additionally, the align/merge circuit 597 may merge switch transfers of data to fill a cache block, if the switch transfer width is less than a cache block in size. Similarly, the PMO 542 may include an align/split circuit 599 coupled between the interconnect interface 580 and the output buffer 594. The align/split circuit 599 may drop leading bytes from a cache block that are not part of a packet, and may merge data from multiple commands on the bus 130 to create a switch transfer's worth of data (e.g. 16 bytes, in one embodiment).

In some embodiments, various virtual channels may be used to ensure deadlock-free transfer on the bus 130. For example, in one embodiment, the PMI 540 may implement a composted command channel for descriptor prefaces; a posted command channel for descriptor write backs, packet data writes, and configuration/status register (CSR) read responses; a response channel for read data responses; and a CSR read/write channel for CSR read and write commands. In one embodiment, the PMO 542 may implement a composted command channel for descriptor prefaces and packet data fetches; a posted command channel for descriptor write backs and CSR read responses; and a response channel for read data responses; and a CSR read/write channel for CSR read/write commands.

An exemplary descriptor ring 600 is shown in FIG. 6, for one embodiment, along with a corresponding descriptor control register or registers 610 (part of the descriptor control registers 596A). Descriptor rings may be similar for both the PMI 540 and the PMO 542. In the embodiment of FIG. 6, the descriptors are stored in a memory region defined by the base address ("base" field of the registers 610 in FIG. 6) and the size ("size" field of the registers 610 in FIG. 6). The base address points to the first descriptor (descriptor 0) in memory, and the size is an offset to the end of the last descriptor (descriptor N−1). A prefect count indicates how many descriptors released to the packet manager are already fetched. When there is no space in the prefect buffer or when the "count"=the "prefect count," the packet manager will stop perfecting. When a descriptor is used, both the "count" and the "prefect count" registers are decremented. The descriptors may be used in a ring. That is, descriptors may be used in consecutive order starting at descriptor 0 and proceeding to descriptor N-1. When the last descriptor N-1 has been used, the next descriptor to be used is descriptor 0 (indicated in FIG. 6 by the dashed line from descriptor N-1 to descriptor 0).

Each descriptor points to a memory buffer (that is, the descriptor includes the address of the memory buffer), and may also include various attributes of the memory buffer. For example, in FIG. 6, the descriptor 602A points to the memory buffer 604A and the descriptor 602B points to the memory buffer 604B.

The descriptors are made available to the packet manager circuit 516 by software. Once the packet manager circuit 516 has used a descriptor to store a packet (or reads the packet from the descriptor for transmission), the packet manager circuit 516 returns the descriptor to software. In one embodiment, the packet manager circuit 516 returns a descriptor to software by resetting a hardware (HW) bit in the descriptor, described in more detail below. Software sets up the descriptors in the descriptor ring, and writes the number of descriptors being made available to the count corresponding to that descriptor ring ("count" field in the registers 610 in FIG. 6). The value written to the count field is added by the control circuit 584 to the value in the count field, resulting in the count of available descriptors. The "last" field in the registers 610 in FIG. 6 is an index, measured from the base address, to the last descriptor that was used by the packet manager circuit 516 and returned to software. Thus, the descriptors beginning with the next descriptor in the ring after the descriptor indicated by the "last" field and the following "count"-1 number of descriptors are available for packet manager circuit use.

In one embodiment, the packet manager circuit 516 may prefect one or more descriptors. The "prefetch" field of the registers 610 indicates the index, measured from the base address, of the most recently perfected descriptor. Thus, the next descriptor to be perfected may be the descriptor in the ring which follows the descriptor indicated by the prefect index. Alternatively, the prefect index may indicate the next descriptor to be perfected. In one embodiment, the packet manager circuit 516 does not attempt to prefect a descriptor which has not been made available by software and thus the prefect index may generally indicate a descriptor between the "last" descriptor and the descriptor corresponding to the "last" index plus the "count."

Figure 7:
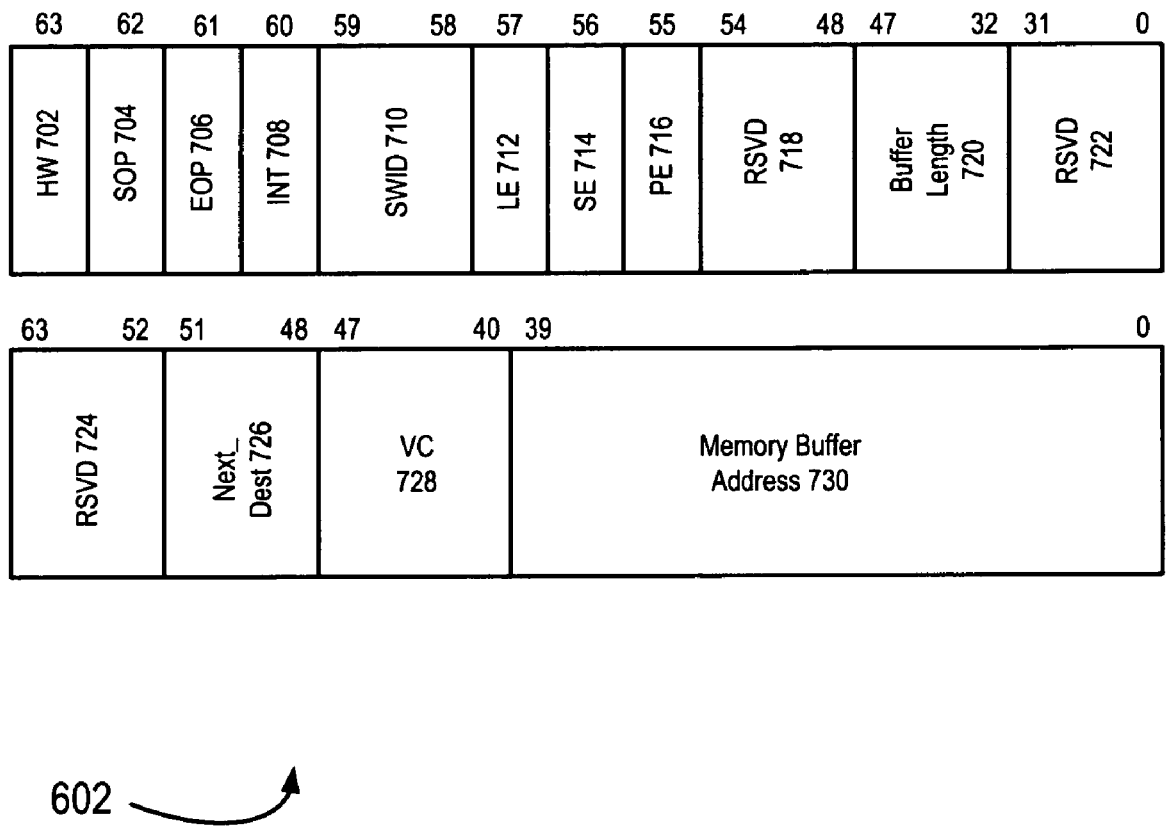
FIG. 7 is a block diagram of one embodiment of a descriptor.

FIG. 7 is a block diagram of one embodiment of a descriptor 602. In the embodiment of FIG. 7, the descriptor comprises 16 bytes illustrated as two 8 byte words. The bit ranges for the fields within each 8 bytes are shown above the fields. Fields labeled RSVD 718, 722, 724 are reserved.

The descriptor 602 includes a variety of status information stored in bits 63:55 of the first 8 byte word. In particular, a hardware bit (HW) 702 is included. Software may set the HW bit 702 to indicate that the descriptor 602 is available for packet manager circuit 516 use. The packet manager circuit 516 may clear the HW bit to return the descriptor to software.

The SOP 704 and EOP 706 bits are used to indicate whether the memory buffer corresponding to the descriptor includes the start of the packet or the end of the packet. A packet may be stored in one or more memory buffers. If the memory buffer located by the descriptor 602 includes the start of a packet, the SOP bit 704 is set. Otherwise, the SOP bit is clear. If the memory buffer includes the end of the packet, the EOP bit 706 is set. Otherwise, the EOP bit is clear. Thus, if a packet is stored in one memory buffer, both the EOP and SOP bits in that descriptor are set. If a packet is stored in more than one memory buffer, the SOP bit 704 in the descriptor corresponding to the first memory buffer is set and the EOP bit 706 in the descriptor corresponding to the last memory buffer is set. Other EOP and SOP bits in the descriptors are clear. For input queue descriptors, the control circuit 584 sets or clears the EOP and SOP bits when writing the updated descriptor back to memory after writing packet data into the memory buffer. For output queue descriptors, software sets or clears the EOP and SOP bits when generating the descriptors for the packets. In some embodiments, having both the EOP and SOP bits 704, 706 in the descriptors may reduce traffic when packet processing is performed by multiple processors. For example, if the processor searches backward in the descriptor ring to find a packet to process, the SOP bit indicates that the start of a packet has been found, eliminating another read to find the EOP bit in the preceding descriptor is set.

The INT bit 708 is used to indicate if the packet manager circuit 516 is to generate an interrupt when the descriptor is complete (e.g., when the packet manager circuit 516 is writing the updated descriptor back to memory). Software may set the INT bit to cause the interrupt and clear the INT bit to not cause the interrupt.

The SWID field 710 may indicate the interface circuit (e.g., the receiver interface circuit) on which the packet was received, for input queue descriptors. The LE bit 712 may indicate, when set, that an error was encountered in the receiver interface circuit that received the packet. In particular, if the receive circuit is receiving SPI-4 phase 2 traffic, the LE bit may indicate, when set, that a DIP-4 error occurred. The SE bit 714 may indicate, when set, that a SPI-4 abort control word was received in the packet or an error was detected in a PoHT transaction. The PE bit 716 may indicate, when set, that the packet manager circuit detected an error when transferring the packet.

The buffer length field 720 indicates the size of the memory buffer indicated by the descriptor 602 (in bytes). For input queue descriptors, the control circuit 584 may overwrite the buffer length field to indicate the actual length used to store packet data.

The next_dust field 726 in the descriptor is used, for output queue descriptors, to store the next_dust value for PoHT packets. The control circuit 590 may read the next_dust field and transmit the value with the packet to the transmit interface circuit that is to transmit the packet.

The VC field 728 stores the IVC for a received packet, if the packet was transmitted on the SPI interface. For output queue descriptors, the VC field may store a value for which the most significant 4 bits are transmitted to the transmit interface circuit to transmit the packet, and the transmit interface circuit may append the bits to the OVC to generate the VC field in the SPI-4 packet. The memory buffer address field 730 stores the address of the memory buffer indicated by the descriptor 602.

It is noted that, while various bits have been described above as having certain meanings when set or clear, the opposite meanings may be assigned to the set and clear states. Generally, any indication may be used in various embodiments.

In connection with the packet manager example of using descriptors described above, the packet manager 516 can inform the software of the descriptor release by interrupting a processor when one or more packets are received. This is referred to as a "completion interrupt." For example, the packet manager may include a packet counter that is used to generate an interrupt after transferring a configurable number of packets. This is of most use in the receive channel. If the interrupt count is set to "one," then an interrupt will be raised after every packet. Since this can swamp the system with interrupts, the count would typically be set higher and the receive interrupt service routine will be written to accept a batch of packets. However, in order to avoid imposing a high delay before packets are serviced when they are arriving at a low rate, the interrupt can also be delayed by an interrupt timer 530. In accordance with the present invention, the timer 530 is programmable so that it starts counting when the first packet reception is complete and will increment at a predetermined rate (such as controlled by the CPU clocks). If the interrupt has not been raised because the packet count threshold has not been reached, the interrupt will be forced when the timer 530 has counted to a programmed limit. The completion interrupts are also available for transmit interfaces. In this case, the counter will increment when a packet transmission has completed, and the timer 530 will start running when the first transmission has completed. This could be used to detect the transmitter being unable to send for an unacceptably long period. In a selected embodiment, the interrupt timer and packet counter are cleared by the processor when it reads an interrupt status register for the channel, thereby disabling the timer and zeroing the received packet count to prepare the system for the next batch of packets.

In like fashion, descriptor-based packet manager transfers can also use the timer of the present invention implemented as a descriptor timer 530 to improve memory read and write operations. In selected embodiments, multiple timers may be provided, such as a timer for the packet manager input 540, a timer for the packet manager output 542, a timer for descriptor write back operations and a timer for the interrupt operations. For example, write operation bandwidth can be increased by writing a full cache line width using two (or more) descriptors' worth of data using a write-invalidate command, which is much quicker than using a read-modify-write command for writing less than a full cache line. For example, the write invalidate command invalidates any cache lines holding copies of the descriptor, and returns ownership of the cache line to the L2 cache 118 and memory system 125 (the default owner). To take advantage of this property of write-invalidate commands, the packet manager input 540 will release descriptors by increments of two to reduce descriptor bandwidth. To promote full cache line transfers, timer 530 is set after the first descriptor in a cache line is ready to be released to the software. If the other descriptor in the same cache line is finished before the timer 530 expires, both descriptors will be released together with a write-invalidate command on the bus 130. If the timer 530 expires, then both descriptors will be written back one by one with read-modify-write commands (read-exclusive followed by write).

While multiple individual counter circuits could be used to implement the interrupt and descriptor timers for multiple channels (e.g., 64 virtual channels), such a solution would consume valuable chip area and would increase the system complexity, especially where independent and different time-out settings are required for multiple channels. Accordingly, an exponential channelized timer is advantageously used in connection with multi-channel, multiprocessor applications such as depicted in FIGS. 3-5 to efficiently provide a programmable timer with individual time-out settings for multiple channels. In a selected embodiment, an exponential channelized timer monitors a selected bit position of a free-running timer and generates a pulse whenever a transition is observed at that bit location. In this embodiment, the time-out values that can be set are exponential values (power of 2), so the exponential channelized timer acts as an interval timer where the timer accuracy goes down as the interval increases. For example, if an exponential channelized timer for a particular channel is programmed to monitor bit location number five of a free running 32-bit counter, then the time-out will be generated within a time interval of $32(2^5)$ and $63(2^6-1)$, reflecting the fact that the free running timer is not reset with each first packet. As will be appreciated, this interval increases exponentially as the monitored bit location register becomes more significant. Therefore, the timer gets less accurate as this value is increased. However, by using multiplexers and control registers for each channel, the exponential timer can be used to generate time-outs for multiple channels without requiring long timer counters for each channel, using only a single free running counter. The timer module 330 can be implemented by the structures disclosed in copending U.S. patent application entitled "Exponential Channelized Timer" by K. Oner, Ser. No. 10/684,916, filed Oct. 14, 2004, and assigned to B*roadcom Corporation*, which is also the assignee of the present *application*, and is hereby incorporated by reference in its *entirety*.

Figure 8:
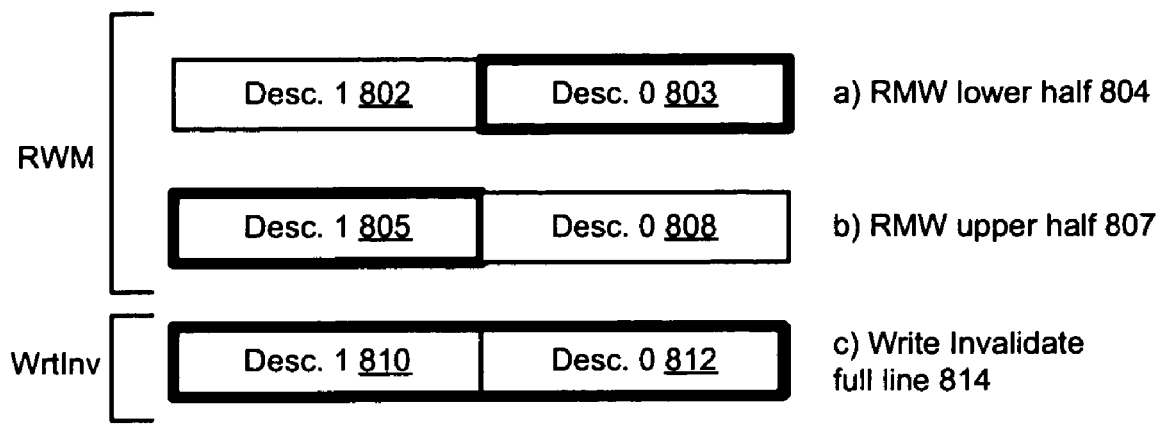
FIG. 8 illustrates different write back operations used to write back descriptors.

Turning now to FIG. 8, two types of descriptor write back operations are illustrated that may be used in connection with the present invention to write back multiple descriptors to a cache memory. Conventional descriptor handling techniques would write back multiple descriptors (e.g., Descriptor 0 and Descriptor 1) as they arrive with a sequence of read-modify-write operations, whereby the lower half of two available descriptors (e.g., Descriptor 0 803) would be written to memory using a first RMW operation (RMW lower half 804), and then the upper half of two available descriptors (e.g., Descriptor 1 805) would be written to memory using a RMW operation (RMW upper half 807). However, when multiple descriptors are available for write back operations, the present invention takes advantage of a write invalidate operation to write back multiple descriptors (e.g., Descriptor 0 810 and Descriptor 1 812) at the same time using a write invalidate command to write an entire line of the memory (Write Invalidate full line 814). The present invention is advantageously employed when a plurality of descriptors can be combined into a single line of memory, such as a full cache line in L2 cache 118.

To take advantage of the faster write-invalidate operations for writing back multiple descriptors, the present invention provides a descriptor write back delay mechanism whereby the write back of the completed descriptors is delayed until a minimum or threshold number of descriptors (e.g., two descriptors) are completed and ready for transfer. In this way, instead of doing multiple RMW operations for writing back multiple descriptors, a single write invalidate (Writing) operation is used to write back the multiple descriptors all at once. For example, when two 16 B descriptors are ready to be written back (i.e., each descriptor is N bytes long), they can be combined into a full 32 B cache line write-invalidate command (i.e., a full cache line that is 2N bytes long). Since a write invalidate command overwrites a full cache line in the memory, no read operation from memory is needed. By using a write invalidate command to write back multiple completed descriptors at the same time, the speed of descriptor write back operations is increased, thereby achieving high performance packet transfers.

Figure 9:
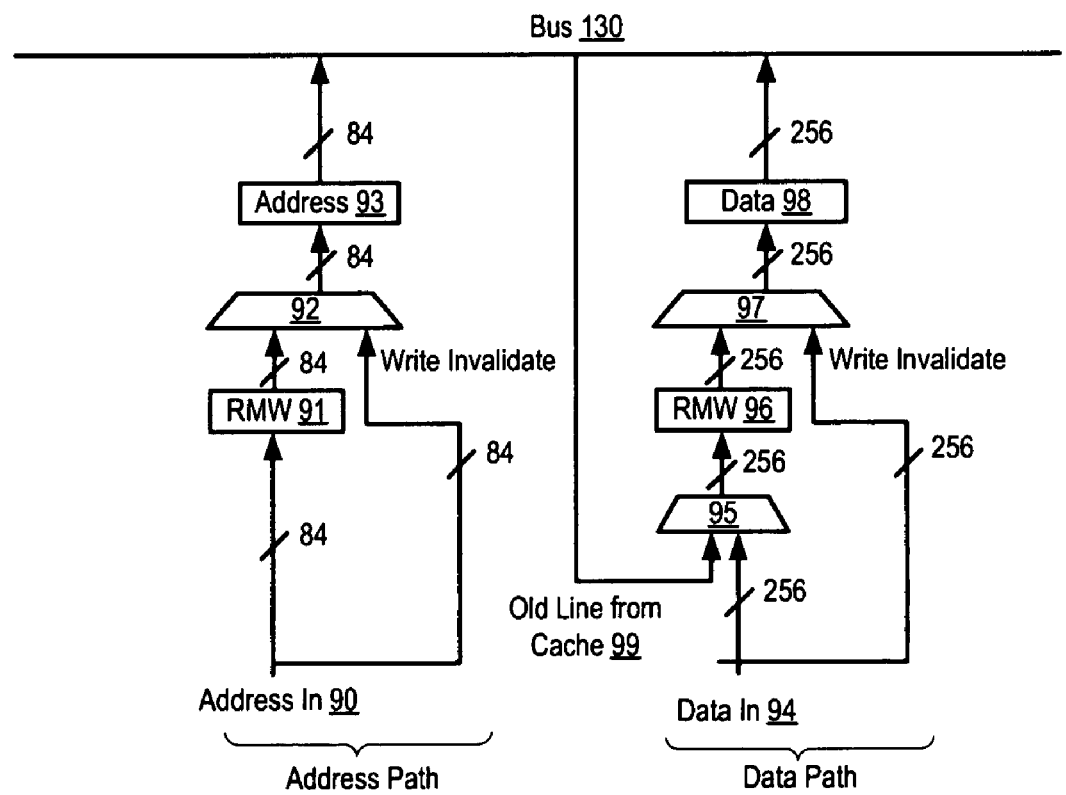
FIG. 9 illustrates the packet manager interconnect interface address and data paths for descriptor write back.

FIG. 9 shows the address and data paths for the write-invalidate and RMW mechanisms implemented in a packet manager interconnect interface 580 in accordance with the present invention. As depicted, an RMW command is issued by storing the address (Address In 90) for the cache line being written to in the RWM register 91, where it must be maintained for the subsequent data write operation to the address. The stored RMW address is passed by the address multiplexer 92 (which also receives write invalidate addresses and read request addresses) to an address register 93 that is coupled to the bus 130. The address register 130 is used for snooping or cache coherency purposes. Data 99 stored in cache memory at the RMW address (preferably a full 32 B cache line of data) is retrieved and passed by the bus 130 to the data multiplexer 95. This retrieval imposes delay while the memory is accessed. The multiplexer 95 also receives the new data to be written to memory by the RWM command (Data In 94). For example, the RMW input data 94 may also be 32 B of data, where only the lower half is to be changed by the RMW operation, such as depicted in FIG. 8 with the RMW lower half write operation 804. The RMW register 96 selectively overwrites or modifies the retrieved data 99 with the new data 94, and the result is passed through multiplexer 97 to a data register 98 that is coupled to the bus 130. Thus, the modified data stored in register 98 is written back to the cache line specified by the address held in the address register 91.

As for the write invalidate command, FIG. 9 shows that the interconnect interface 580 passes the cache line address (Address In 90) directly to the address multiplexer 92. In write invalidate mode, this address is selected and stored in the address register 93 that is coupled to the bus 130. In the data phase of the bus 130, the new data (Data In 94) to be written to memory by the write-invalidate command (preferably a full 32 B cache line of data) is passed directly to the multiplexer 97 and data register 98 that is coupled to the bus 130. Thus, without any delay imposed by reading the cache line data, the data is stored in register 98 and written to the cache line specified by the address held in the address register 93.

While the operation of FIG. 9 is described primarily with reference to the descriptor write back operations performed for data write operations through the packet manager input 540, it will be appreciated that an identical interface circuit may be included in the interface interconnect for processing output descriptor write back operations that are performed for data read operations through the packet manager output 542.

As described above, the interconnect interface operations for writing a data to memory using RMW operations require extra circuit operations as the address for the memory line being modified must be held while the memory is read. When a full line of data is to be written back to memory (such as when two descriptors are prepared for transfer and are to be written back to cache memory by the packet manager), this delay can be avoided by using a write-invalidate command to write both descriptors as a single line to the memory. However, it is not always possible to combine descriptors before writing the descriptors back. For example, when a packet uses an odd number of packets and then the next packet does not arrive for a long time, the software might wait for a long time before it can process the packet it has already received. To address this situation, a descriptor write back timer mechanism is provided whereby, for each active channel, a timer is set when the first descriptor is received or prepared. If, after the timer has expired, the packet manager is still waiting for one more descriptor to combine with the previously completed descriptor, the packet manager will do a RMW operation to write back this descriptor. Of course, if a descriptor is written back with a RMW, then when the next descriptor is completed, it will have to be written back with RMW.

Figure 10:
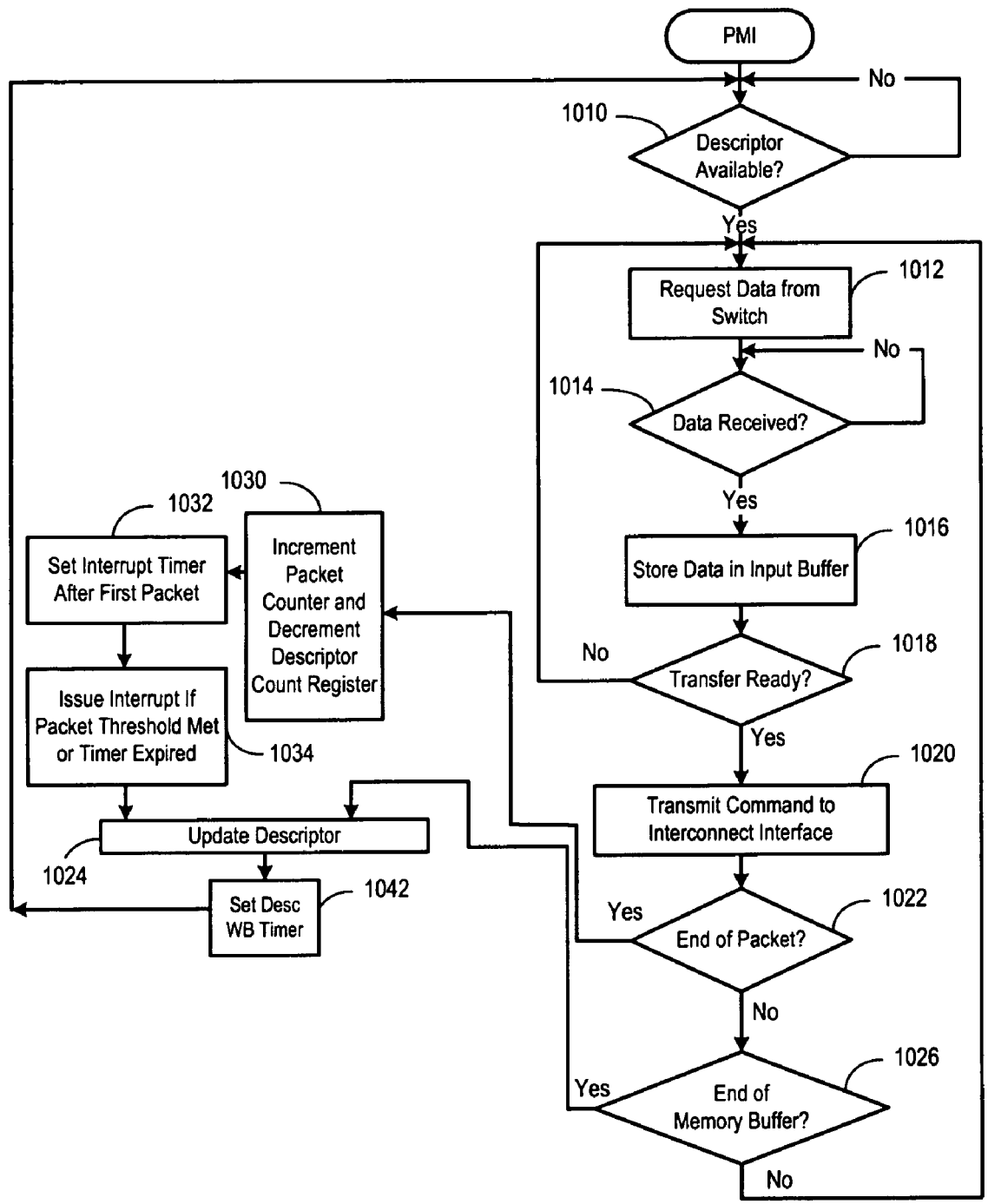
FIG. 10 is a flowchart illustrating operation of selected embodiments of the descriptor write back delay mechanism of the present invention implemented as part of an input packet manager circuit.

Turning next to FIG. 10, a flowchart is shown illustrating operation of one embodiment of the PMI 540 (e.g., the control circuit 584 in the embodiment of FIG. 5) for one of the input queues. The PMI 540 may perform similar operations in parallel for other input queues. The PMI 540 waits for a descriptor to become available (decision block 1010). For example, in the embodiment of FIG. 7, a descriptor may be available if the HW bit 702 is set by the software. In other embodiments, the HW bit 702 may indicate availability from a software point of view, but the descriptor count described above being greater than zero may indicate that a descriptor is available to the PMI 540. If the descriptor is available, then the PMI 540 may request data from the switch 140 for the input queue (block 1012) via the switch interface circuit 582, and waits for data to be received (decision block 1014). In parallel (and described with reference to FIG. 12), the PMI 540 may prefect additional descriptors, if desired, incrementing the prefect index in the descriptor control registers 596A in response. Once data is received into the input buffer 588 (block 1016), the PMI 540 determines if a transfer is ready to be made to memory (decision block 1018) and then transfers the data to the interconnect interface 580 for storage in memory (decision block 1020). In such embodiments, a transfer may be ready if the end of the packet has been reached (decision block 1022), if the end of the memory buffer has been reached (decision block 1026), or if a cache block of data has been reached.

When the end of the packet has been transmitted to memory, the PMI 540 updates the descriptor control register to indicate that the PMI is finished with the descriptor(s) associated with the packet. Updating is accomplished by incrementing the packet count field and decrementing the descriptor count field in the control register (decision block 1030).

In accordance with the present invention, software can find out that new packets have been stored in memory in a variety of ways, including spinning on the descriptors to see if their hardware bits are reset; reading the descriptor control register to check on the status of the data transfer; or waiting for the packet manager to interrupt the processor. When interrupts are generated upon completion of packet processing, a channelized interrupt timer may be used to promote interrupt issuance so that a threshold packet processing count does not effectively block an interrupt from issuing if the threshold packet processing count is not met. Accordingly, if the transfer included the end of the packet (decision block 1022) and this packet is the first packet (or the first packet after a threshold number of packets have been processed), the PMI 540 may set the interrupt timer to start running so that a time-out signal is issued after a programmable predetermined time or interval (decision block 1032). The PMI 540 then informs the software of the descriptor release by interrupting a processor when the threshold number of packets have been processed or the interrupt timer expires, whichever occurs first (decision block 1034). Of course, it will be appreciated that this interrupt mechanism may be optionally included or not, in which case the decision blocks 1032 and 1034 would be bypassed.

Figure 13:
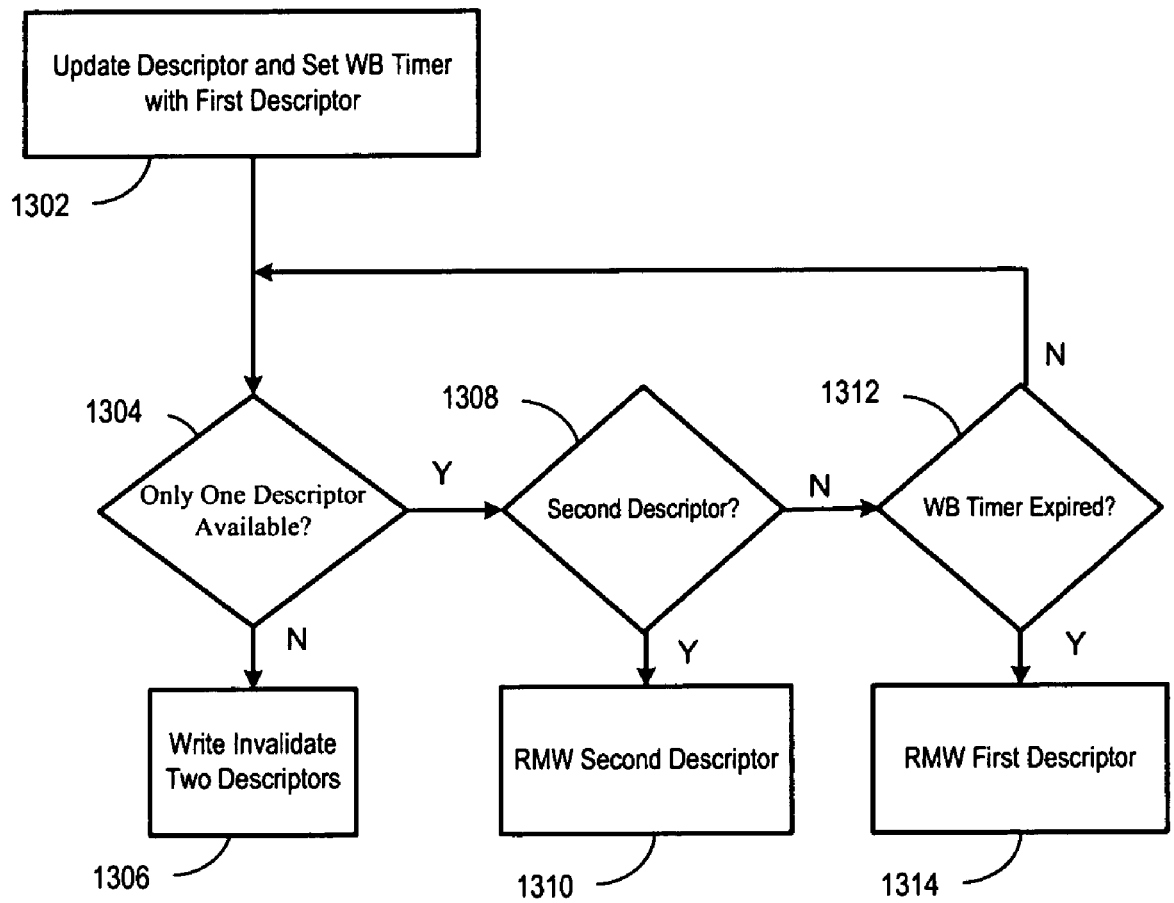
FIG. 13 illustrates an exemplary flowchart implementation of a descriptor write back delay methodology in accordance with the present invention.

In either event, if the data transfer included the end of the packet (decision block 1022), the PMI 540 may update the descriptors corresponding to the memory buffers in which the packet data was stored (block 1024), as depicted in FIG. 13. In this case, the PMI 540 may set the EOP bit 706 in the descriptor, as well as clear the HW bit 702. If the descriptor also includes the start of the packet, the PMI 540 may set the SOP bit 704. The PMI 540 updates the buffer length field 720 of the descriptor to reflect the number of packet bytes written into the memory buffer indicated by the descriptor. Finally, the PMI 540 writes the IVC for the packet into the VC field 728 of the descriptor and may write the next_dust 726 from the receive circuit 162, 166, 170 to the next_dust field of the descriptor.

If the transfer did not include the end of the packet but the end of the memory buffer has been reached (decision block 1026), the packet manager input 540 may update the descriptor (block 1024). In this case, the EOP bit 706 is clear since the end of the packet has not yet been reached. If the memory buffer includes the start of the packet, the PMI 540 sets the SOP bit 706. The PMI 540 clears the HW bit 702, may store the IVC in the VC field 728 of the descriptor, and may write the next_dust from the receive circuit 162, 166, 170 to the next_dust field 726 of the descriptor.

Once the descriptor has been updated, it is written back to memory in accordance with the present invention by attempting to write back multiple descriptors together in order to reduce bus traffic that is required when only a single descriptor is written back. In particular and as described below with reference to FIG. 13, if only a single descriptor has been released by the PMI, it is written back to memory with a read-modify-write command on the bus 130. However, the PMI 540 attempts to accumulate descriptors to minimize the number of write commands and to minimize read-modify-writes on the bus 130. For example, the PMI 540 will attempt to release descriptors by increments of 2 to reduce descriptor bandwidth by determining when two descriptors are ready for write back and then writing back both descriptors together to memory. However, the PMI 540 can not wait indefinitely for the subsequent descriptor to be released. In such embodiments, a timer will be set after the first descriptor in a cache line is ready to be released to the software (e.g., block 1042) in order to control the descriptor write back operations.

In particular and as illustrated in FIG. 13, if both descriptors of a descriptor pair for a cache line are finished before the timer expires ("No" outcome on decision block 1304), both descriptors will be released together with a write-invalidate command on the bus 130 (block 1306). If there is only one descriptor that has been updated and released (block 1302) and it is determined that this is the second descriptor of a cache line descriptor pair ("Yes" outcome on decision block 1308), then this means that the first half of the descriptor pair has already been written back, in which case the second descriptor is written back as a read-modify-write command to memory (block 1310). Alternatively, if the descriptor is the first descriptor of a cache line descriptor pair ("No" outcome on decision block 1308), then the write back timer is checked to see if it has expired (decision block 1312). If the timer has not expired ("No" outcome on decision block 1312), the PMI loops back to wait for additional descriptors (decision block 1304) and to continue checking for timer expiration, in which case the first descriptor is written back to memory with a read-modify-write command (block 1314).

If the timer expires before the second descriptor is ready ("Yes" outcome on decision block 1312), then the updated (first) descriptor (and any late arriving descriptor) will be written back one by one with read-modify-write commands (Read-Exclusive followed by Write) when they are ready to be released (block 1314). If the updated descriptor is the second descriptor of a descriptor pair, but the first descriptor of the descriptor pair has already been written back, ("Yes" outcome on decision blocks 1304, 1308), the updated (second) descriptor will be released with a read-modify-write command on the bus 130 (block 1310). In other embodiments, the PMI 540 may not attempt to accumulate descriptors or may accumulate descriptors until one or more of the above conditions hold.

Figure 11:
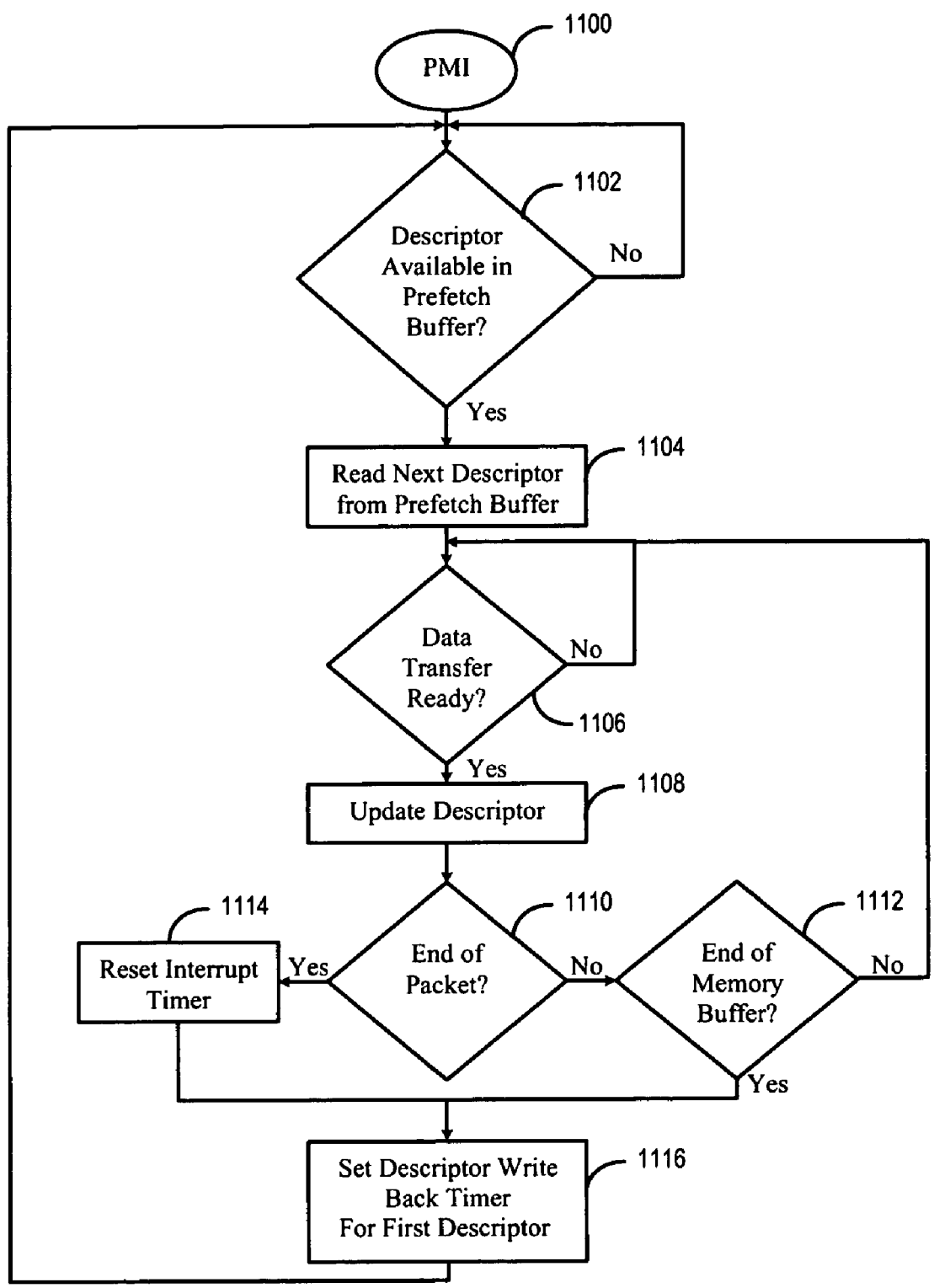
FIG. 11 illustrates how descriptors are used in one embodiment of the present invention implemented as part of an input packet manager circuit.

Turning now to FIG. 11, a flowchart is shown illustrating how descriptors are used in one embodiment of the PMI 540 (e.g., the control circuit 584 in the embodiment of FIG. 5) for one of the input queues. The PMI 540 may perform similar operations in parallel for other input queues. When the PMI 540 determines that a descriptor is available in the prefect buffer 586 (decision block 1102), the descriptor is read by the PMI 540 (block 1104) and processed to store the packet data (fragments) in memory. When the data transfer specified by the retrieved descriptor is ready for transfer to memory (decision block 1106), the retrieved descriptor may be updated (block 1108), for example with information about the actual length of data stored in memory. If the retrieved descriptor is the not the last descriptor for a packet being stored or the end of the buffer ("No" outcomes in decision blocks 1110, 1112), the PMI 540 continues transferring data under control of available descriptors. However, if the retrieved descriptor was the last descriptor for a packet ("Yes" outcome in decision block 1110), the interrupt timer is started (block 1114) to issue a time-out signal that prompts the PMI 540 to issue an interrupt if a threshold number of packets have not been processed by the PMI by the time the timer expires. In addition, the retrieved descriptor write back timer is set (block 1116) before the PMI checks for additional descriptors. If the retrieved descriptor was for data that reached the end of the memory buffer ("Yes" outcome in decision block 1112), the descriptor write back timer is set (block 1116) and the PMI 540 returns to decision block 1102 to determine if the next descriptor is available in the prefect buffer.

Figure 12:
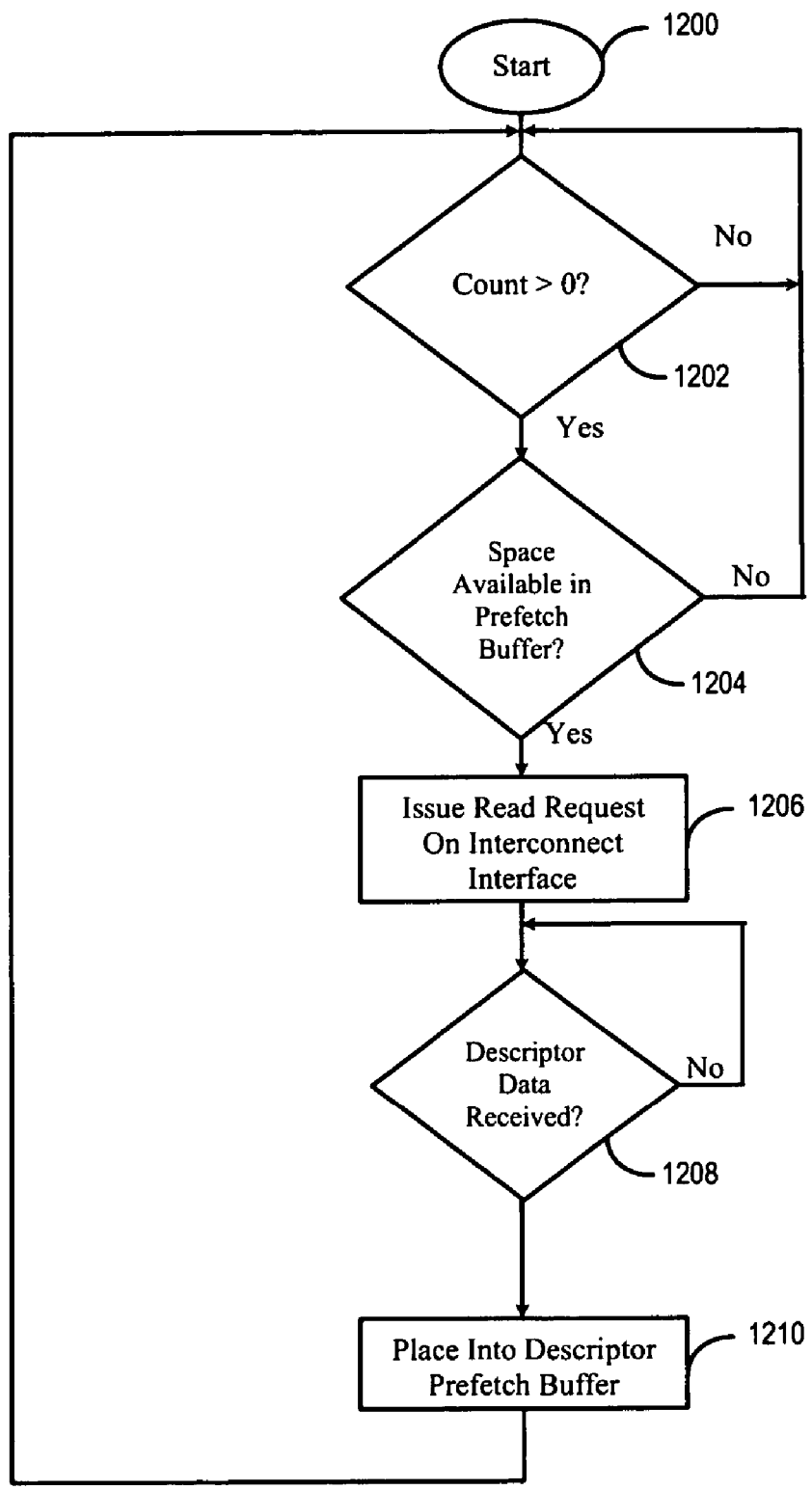
FIG. 12 illustrates a descriptor prefect engine used in a selected embodiment of the present invention.

FIG. 12 illustrates a descriptor prefect engine used in a selected embodiment of the present invention. When software updates a count field in the descriptor control register to indicate that one or more descriptors have been released to the PMI 540, the PMI detects this (decision block 1202) and then determines when space is available in the prefect buffer 586 (decision block 1204), at which time the PMI control circuit 584 issues a read request to the interconnect interface 580 in order to retrieve the descriptor from memory. Once the descriptor is retrieved from memory (decision block 1208), the PMI control circuit 584 places the retrieved descriptor in the descriptor prefect buffer 586 (block 1210), and then determines if the count has been incremented further. Alternatively, the PMI control circuit 584 decrements the count field after storing the descriptor in the prefect buffer (block 1210) and then returns to decision block 1202 to detect if the count field is greater than zero, which indicates that additional descriptors have been released by software and are available for perfecting.

The flowchart illustrations of FIGS. 10-13 illustrate methodologies that can be implemented sequentially, or can be split into parallel engines that operate simultaneously. Thus, the blocks shown in FIGS. 10-13 are illustrated in a particular order for ease of understanding, but any order may be used. Furthermore, blocks may be performed in parallel in the circuitry forming the PMI 540. In addition, the flowcharts may represent the operation of the PMI 540 over a number of clock cycles.

Thus, in accordance with the present invention, if a descriptor is ready to be released to software after transferring data, the packet manager 516 may transmit a write command to the interconnect interface circuit 580 to write the descriptor to the memory controller 122 for update into the memory 125, either as a write invalidate command if the second descriptor is ready before the descriptor timer expires, or as a read-modify-write command if the second descriptor is not ready before the descriptor timer expires. A channelized descriptor timer in accordance with the present invention may be used to keep the descriptor processing moving along so that a minimum threshold descriptor requirement does not effectively block a descriptor from being processed if the threshold is not met.

As will be appreciated, the present invention may be implemented in a computer accessible medium including one or more data structures representative of the circuitry included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, etc., as well as media accessible via transmission media or signals such as electrical, electromagnetic, or digital signals, conveyed via a communication medium such as a network and/or a wireless link. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more net list(s) comprising lists of gates from a synthesis library. The net list(s) comprise a set of gates which also represent the functionality of the hardware comprising the circuitry. The net list(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium may be the net list(s) (with or without the synthesis library) or the data set(s), as desired. In yet another alternative, the data structures may comprise the output of a schematic program, or net list(s) or data set(s) derived there from. While a computer accessible medium may include a representation of the present invention, other embodiments may include a representation of any portion of the multiprocessor system and/or the descriptor write-back circuitry (e.g., processors, memory controller, bus, packet manager circuit (or portions thereof), switch, receive/transmit interface circuits (or portions thereof), etc.).

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. In an integrated circuit multichannel packet transfer device, an apparatus for transferring a plurality of data packets, comprising:
    a first interface circuit for receiving packet data on a first channel;
    a memory;
    a packet manager circuit coupled between the first interface circuit and the memory to receive data on the first channel from the first interface circuit, wherein the packet manager circuit is configured to write at least a first data packet fragment to the memory under control of a first descriptor, and is configured to write additional data packet fragments to the memory under control of corresponding additional descriptors;
    a register for storing a minimum descriptor count;
    a timer for generating a first time-out signal at a predetermined time after the first descriptor is ready for transfer; and
    a controller for controlling descriptor write back operations to memory in either read-modify-write mode or write-invalidate mode, wherein the controller writes a plurality of descriptors together to memory in a single write-invalidate operation only if the plurality of descriptors that are ready for transfer meets or exceeds the minimum descriptor count and if the plurality of descriptors that are ready for transfer meets or exceeds the minimum descriptor count before the first time-out signal is generated.

2. The apparatus recited in claim 1, wherein the controller writes the plurality of descriptors separately to memory as a sequence of read-modify-write operations if the plurality of descriptors is not ready for transfer before the first time-out signal is generated.

3. The apparatus recited in claim 1, wherein the timer comprises
    a multi-bit counter,
    a multiplexer having one select line, one output and multiple inputs, with each input coupled to a corresponding bit of the multi-bit counter,
    a timer control register coupled to the select line of the multiplexer, and
    a first pulse generator coupled to the multiplexer output for generating the first time-out signals,
    wherein the multiplexer selects one of the bits in the multi-bit counter for output to the pulse generator in response to the timer control register to generate the first time-out signal.

4. The apparatus recited in claim 1, where the memory comprises a cache memory having a line width of 2N bytes, and the descriptors each have a width of N bytes, where N is a positive integer.

5. The apparatus recited in claim 1, where the memory comprises a system memory and a cache memory, such that the packet manager writes data packets or descriptors to the system memory or cache memory.

6. The apparatus recited in claim 1, where the timer comprises a memory device for programmably storing a timer setting to selectively determine the predetermined time at which the first time-out signal is generated.

7. The apparatus recited in claim 1, comprising:
a second interface circuit for transmitting packet data on a second channel;
an packet manager output circuit coupled between the memory and the second interface circuit to transmit data from the memory on the second channel, wherein the packet manager output circuit is configured to write output data packets to the second interface circuit under control of a plurality of output descriptors;
a second timer for generating a second time-out signal a predetermined time after a first output descriptor of the second channel is ready for transfer; and
a output controller for controlling output descriptor write back operations to memory in either read-modify-write mode or write-invalidate mode, wherein the output controller writes a plurality of output descriptors together to memory in a single write-invalidate operation if the plurality of output descriptors is ready for transfer before the second time-out signal is generated.

8. The apparatus recited in claim 7, wherein the output controller writes the plurality of output descriptors separately to memory as a sequence of read-modify-write operations if the plurality of output descriptors is not ready for transfer before the second time-out signal is generated.

9. A method comprising:
setting a minimum descriptor count;
setting a first time-out period;
receiving a first packet fragment in an interface circuit;
receiving subsequent packet fragments in the interface circuit;
transmitting the first and subsequent packet fragments from the interface circuit to a memory under control of corresponding descriptors; and
performing write back operations to memory in either read-modify-write mode or write-invalidate mode, wherein a plurality of descriptors are written back together in a single write-invalidate operation only if the plurality of descriptors that are ready for transfer meets or exceeds the minimum descriptor count and if the plurality of descriptors that are ready for transfer meets or exceeds the minimum descriptor count before the first time-out period expires.

10. The method recited in claim 9, further comprising writing the first and subsequent descriptors back to memory separately as a sequence of read-modify-write commands if the descriptors are not released before expiration of the time-out period.

11. The method recited in claim 9, wherein the descriptors are written back to a cache memory having a line width of 2N bytes, and the descriptors each have a width of N bytes, where N is a positive integer.

12. The method of claim 11, wherein the descriptors are written back to a cache memory having a line width of 32 bytes, and wherein each descriptor has a width of 16 bytes.

* * * * *